(12) United States Patent
Javidi et al.

(10) Patent No.: US 8,155,312 B2
(45) Date of Patent: Apr. 10, 2012

(54) OPTICAL DATA STORAGE DEVICE AND METHOD

(75) Inventors: Bahram Javidi, Storrs, CT (US); Elisabet Perez-Cabre, Sabadell (ES)

(73) Assignee: The University of Connecticut, Farmington, CT (US)

( * ) Notice: Subject to any disclaimer, the term of this patent is extended or adjusted under 35 U.S.C. 154(b) by 939 days.

(21) Appl. No.: 11/531,851

(22) Filed: Sep. 14, 2006

(65) Prior Publication Data

US 2007/0086653 A1    Apr. 19, 2007

Related U.S. Application Data

(60) Provisional application No. 60/727,663, filed on Oct. 18, 2005.

(51) Int. Cl.
*H04L 9/00* (2006.01)
(52) U.S. Cl. .............................. 380/54; 380/28; 713/167
(58) Field of Classification Search ............... 380/54
See application file for complete search history.

(56) References Cited

U.S. PATENT DOCUMENTS

| | | | |
|---|---|---|---|
| 3,643,068 A * | 2/1972 | Mohan et al. ........... 235/462.03 |
| 4,053,228 A | 10/1977 | Schiller ........................ 356/71 |
| 4,621,032 A * | 11/1986 | deNeufville et al. ......... 428/688 |
| 4,719,594 A * | 1/1988 | Young et al. ................. 365/113 |
| 4,832,447 A | 5/1989 | Javidi ...................... 350/162.13 |
| 4,900,128 A | 2/1990 | Lom ............................. 359/11 |
| 4,901,362 A * | 2/1990 | Terzian ........................ 382/197 |
| 5,119,443 A | 6/1992 | Javidi et al. .................... 382/42 |
| 5,303,313 A | 4/1994 | Mark et al. .................. 382/235 |
| 5,339,305 A | 8/1994 | Curtis et al. ................. 369/103 |
| 5,351,310 A * | 9/1994 | Califano et al. ............. 382/199 |
| 5,367,579 A | 11/1994 | Javidi et al. ................... 382/31 |
| 5,485,312 A | 1/1996 | Horner et al. ............... 359/561 |
| 5,497,433 A | 3/1996 | Itoh et al. .................... 382/211 |
| 5,619,596 A | 4/1997 | Iwaki et al. ................. 382/278 |
| 5,644,655 A | 7/1997 | Windsor ..................... 382/209 |
| 5,699,449 A | 12/1997 | Javidi ......................... 382/156 |
| 5,754,691 A | 5/1998 | Hong .......................... 382/210 |
| 5,841,907 A | 11/1998 | Javidi et al. ................. 382/210 |
| 5,875,108 A | 2/1999 | Hoffberg et al. .............. 700/17 |
| 5,963,148 A | 10/1999 | Sekine et al. ................ 340/905 |

(Continued)

FOREIGN PATENT DOCUMENTS

EP    0706146 A2    10/1996

(Continued)

OTHER PUBLICATIONS

"Optical encryption by double-random phase encoding in the fractional Fourier domain", G.Unnikrishnan, J. Joseph, and K. Singh; Feb. 22, 2000.*

(Continued)

*Primary Examiner* — Kambiz Zand
*Assistant Examiner* — Yonas Bayou
(74) *Attorney, Agent, or Firm* — Cantor Colburn LLP

(57) ABSTRACT

A device disclosed herein relates to a rotation invariant data storage device comprising, a data storage device with an optically sensible image, encoded data stored within the sensible image, and a plurality of radial vectors stores the encoded data. The encoded data comprises an image that has been encrypted to a two-dimensional (2-D) white noise matrix and converted to a one-dimensional (1-D) array.

34 Claims, 24 Drawing Sheets

U.S. PATENT DOCUMENTS

| | | | | |
|---|---|---|---|---|
| 6,002,499 | A | 12/1999 | Corboline et al. | 359/2 |
| 6,002,807 | A | 12/1999 | Guerci | 382/278 |
| 6,067,374 | A | 5/2000 | Fan et al. | 382/135 |
| 6,122,739 | A * | 9/2000 | Kutaragi et al. | 726/32 |
| 6,263,104 | B1 | 7/2001 | McGrew | 382/210 |
| 6,304,971 | B1 * | 10/2001 | Kutaragi et al. | 726/3 |
| 6,366,698 | B1 | 4/2002 | Yamakita | 382/187 |
| 6,453,056 | B2 | 9/2002 | Laumeyer et al. | 382/104 |
| 6,711,293 | B1 * | 3/2004 | Lowe | 382/219 |
| 6,801,638 | B1 | 10/2004 | Janssen et al. | 382/104 |
| 6,961,428 | B1 * | 11/2005 | Liu | 380/54 |
| 7,050,635 | B2 | 5/2006 | Javidi et al. | 382/210 |
| 7,068,844 | B1 * | 6/2006 | Javidi et al. | 382/218 |
| 7,353,994 | B2 * | 4/2008 | Farrall et al. | 235/454 |
| 7,428,099 | B1 * | 9/2008 | Javidi et al. | 359/561 |
| 7,447,312 | B2 * | 11/2008 | Javidi et al. | 380/54 |
| 2003/0152227 | A1 * | 8/2003 | Javidi | 380/219 |
| 2004/0101157 | A1 * | 5/2004 | Stach | 382/100 |
| 2004/0143737 | A1 * | 7/2004 | Teicher | 713/167 |
| 2005/0169158 | A1 * | 8/2005 | Abe et al. | 369/275.3 |
| 2005/0269412 | A1 * | 12/2005 | Chiu et al. | 235/462.03 |
| 2006/0115082 | A1 * | 6/2006 | Kevenaar et al. | 380/216 |
| 2007/0086653 | A1 * | 4/2007 | Javidi et al. | 382/181 |
| 2007/0127816 | A1 * | 6/2007 | Balslev et al. | 382/181 |

FOREIGN PATENT DOCUMENTS

| | | |
|---|---|---|
| EP | 1422657 A1 | 5/2004 |
| JP | 2000099670 | 7/2000 |
| WO | WO9007162 | 6/1990 |

OTHER PUBLICATIONS

"Optical encryption by double-random phase encoding in the fractional Fourier domain", K.Singh et al, Fab. 2000.*

"Digital Wavefront Measuring Interferometer for Testing Optical Surfaces and Lenses," J. H. Bruning, D. R. Herriott, J. E. Gallagher, D. P. Rosenfeld, A. D. White, D. J. Brangaccio, Applied Optics, vol. 13, No. 11, Nov. 1974 (pp. 2693-2703).

"Distortion-invariant ID tags for object identification", Elisabet Perez-Cabre, Bahram Javidi, SPIE, vol. 5611, pp. 33-41 (2004).

"Filter Design for Optical Pattern Recognition Multricriteria Optimization Approach," Ph. Refregier, Optics Letters, vol. 15, No. 15, Aug. 1990, (pp. 854-856).

"Fresnel Holograpy," J. B. Develis, G. O. Reynolds, Handbook on Optical Holography, 1979 by Academic Press, Chapter 4.1 (pp. 139-155).

"Fourier Holography," H. H. Arsenault, G. April, Handbook on Optical Holography, 1979 by Academic Press, Chapter 4.3 (pp. 165-180).

"Fraunhofer Holograms," Brian J. Thompson, Handbook on Optical Holography, 1979 by Academic Press, Chapter 4.2 (pp. 157-163.

"Holography," J. W. Goodman, IIntroduction to Fourier Optics, Chapter 9, McGraw-Hill, New York, 996 (pp. 295-341).

"Nonlinear joint power spectrum based optical correlation," Bahram Javidi, Applied Optics, vol. 28, No. 12, Jun. 15, 1989.

"Nonlinear Joint Transform Correlators," B. Javidi, Real-Time Optical Information Processing, Chapter 4, Academic Press, 1994 (pp. 116-183).

"Optical Image Correlation With a Binary Spatial Light Modulator," D. Psaltis, E. Paek, S. Venkatesh, Optical Engineering, vol. 23, No. 6, Nov.-Dec. 1984 (pp. 698-704).

"Optical image encryption based on input plane and Fourier plane random encoding," Philippe Refregier and Bahram Javidi, Optics Letters, vol. 20, No. 7, Apr. 1, 1995.

"Optical Information Processing," Encyclopedia of Electrical and Electronic Engineering, Volume on Optics, John Wiley, 1999, (pp. 470-481).

"Optical Neural Nets," Encyclopedia of Electrical and Electronic Engineering, Volume on Neural Networks, John Wiley, 1998 (pp. 309-327).

"Passive Interferometric 3-D Imagine and Incoherence Gating," H. Arimoto, K. Yoshimori, K. Itoh, Optics Communications, vol. 170, Nov. 1999 (pp. 319-329).

"Pattern and Character Recognition," David Casasent, Handbook on Optical Holography, 1979 by Academic Press, Chapter 10.5, (pp. 503-536).

"Phase-Only Matched Filtering," J. L. Homer and P. D. Gianino, Applied Optics, vol. 23, No. 6, Mar. 15, 1984 (pp. 812-816).

"Phase-Shifting Digital Holography," I. Yamaguchi, T. Zhang, Optics Letters, vol. 22, No. 16, Aug. 1997, (pp. 1268-1270).

"Real-time remote identification and verification of objects using optical ID tags," Bahram Javidi, Opt. Eng. 42(8) 2346-2348 (Aug. 2003).

"Real-Time Vehicle Navigation Using a Holographic Memory," A. Pu, R. Denkewalter, D. Psaltis, Optical Engineering, vol. 36, No. 10, Oct. 1997, (pp. 2737-2746).

"Scale and Rotation Invariant Optical ID Tags for Automatic Vehicle Identification and Authentication," Elisabet Perez-Cabre and Bahram Javidi, IEEE Transactions on Vehicular Technology, vol. 54, No. 4, Jul. 2005.

"Signal Detection by Complex Spatial Filtering," A. Vanderlugt, IEEE Transactions on Information Theory, vol. IT-10, No. 2, Apr. 1964, (pp. 139-145).

"Three-Dimensional Image Processing and Recognition," B. Javidi, E. Tajahuerce, Proceedings of Spie, vol. 4043, No. 26-27, Apr. 2000, (pp. 2-10).

"Three-Dimensional Object Recognition by Fourier Transform Profilometry," J. J. Esteve-Taboada, D. Mas, J. Garcia, Applied Optics, vol. 38, No. 22, Aug. 1999, (pp. 4760-4765).

"Three-Dimensional Optical Fourier Transform and Correlation," J. Rosen, Optics Letters, vol. 22, No. 13, Jul. 1997 (pp. 964-966).

PCT Search Report—PCT/US2006/040305 (References above taken from PCT Search Report).

* cited by examiner

OPTICAL DATA STORAGE DEVICE AND METHOD

CROSS REFERENCE TO RELATED APPLICATIONS

This application claims priority to U.S. provisional application, 60/727,663, filed Oct. 18, 2005, the entire contents of which are incorporated herein by reference.

TECHNICAL FIELD

The disclosed apparatus relates to remote identification of objects and more particularly to an optical tag that can be attached to the objects for facilitating their remote identification and authentication.

BACKGROUND

A passive optical identification tag that could be read by remote receivers, identified, and authenticated could be useful for several purposes including improved security for homeland security. Applying the tags to vehicles, for example, could aid in tasks such as the remote security control of authorized vehicles inside a restricted area or the control of a vehicle fleet for inventory purposes. Such an identification and verification system would be enhanced if the identification tags were optically encoded so that an accurate image of the code can only be made with sophisticated imaging equipment. Encrypting the code prior to application to the identification tag could provide further security. Such security measures could make it nearly impossible for someone to successfully create a counterfeit identification tag or to capture and decipher the data contained in an existing tag.

Accordingly, an identification tag that can be remotely captured, accurately read and authenticated while also being difficult to copy has potential real world applications.

BRIEF DESCRIPTION OF THE INVENTION

An embodiment of a device disclosed herein relates to a rotation invariant data storage device comprising, a data storage device with an optically sensible image, encoded data stored within the sensible image, and a plurality of radial vectors to store the encoded data. The encoded data comprises an image that has been encrypted to a two-dimensional (2-D) white noise matrix and converted to a one-dimensional (1-D) array.

Further disclosed is a device that relates to a scale invariant data storage device comprising, a data storage device with an optically sensible image, encoded data stored within the sensible image, and a plurality of sectors of a circle stores the encoded data. The encoded data comprises an image that has been encrypted to a two-dimensional (2-D) white noise matrix and converted to a one-dimensional (1-D) array.

Further disclosed is a device that relates to a rotation invariant and scale invariant data storage identification (ID) tag comprising, a tag with an optically sensible image with encoded data stored within a plurality of radial vectors and over a plurality of sectors of a circular arc. The encoded data comprises an image that has been encrypted to a two-dimensional (2-D) white noise matrix and converted to a one-dimensional (1-D) array. The plurality of sectors are positioned within a first fraction of a circle and the plurality of radial vectors are positioned within a second fraction of a circle not containing the plurality of sectors.

Further disclosed herein is a method of encoding a data storage device, the method comprising encrypting an image into a two-dimensional (2-D) white noise matrix, further encoding the 2-D matrix into a one-dimensional (1-D) array and further encoding the data storage device with the 1-D array into a plurality of radial vectors.

Further disclosed herein is a method of encoding a data storage device, the method comprising encrypting an image into a two-dimensional (2-D) white noise matrix, further encoding the 2-D matrix into a one-dimensional (1-D) array and further encoding the data storage device with the 1-D array into a plurality of sectors of a circular arc.

Further disclosed is a method of decoding an image captured from a data storage device, the method comprising, decoding radial vectors of the captured image into a one-dimensional (1-D) array, further decoding the 1-D array into a two-dimensional (2-D) white noise matrix, and decrypting the 2-D matrix with a double random phase decryption and a phase key into an image.

Further disclosed is a method of decoding an image captured from a data storage device, the method comprising decoding adjacent sectors of the captured image into a one-dimensional (1-D) array, further decoding the 1-D array into a two-dimensional (2-D) white noise matrix, and decrypting the 2-D matrix with a double random phase decryption and a phase key into an image. 1

Further disclosed is a method of decoding and authenticating an image captured from a data storage device, the method comprising decoding radial vectors of the captured image into a one-dimensional (1-D) array, further decoding the 1-D array into a two-dimensional (2-D) white noise matrix, decrypting the 2-D matrix with a double random phase decryption and a phase key into a decrypted image, and comparing the decrypted image to a stored reference image to authenticate the data storage device.

Further disclosed herein is a method of decoding and authenticating an image captured from a data storage device, comprising decoding adjacent sectors of the captured image into a one-dimensional (1-D) array, further decoding the 1-D array into a two-dimensional (2-D) white noise matrix, decrypting the 2-D matrix with a double random phase decryption and a phase key into a decrypted image, and comparing the decrypted image to a stored reference image to authenticate the data storage device.

Further disclosed herein is a method related to a computer program product for encoding data to an optical data storage device in a computer environment, the computer program product comprising a storage medium readable by a processing circuit and storing instructions for execution by the processing circuit for facilitating a method, and the method comprising, receiving an image to be encoded, encrypting the image into a two-dimensional (2-D) white noise matrix, encoding the 2-D matrix to a one-dimensional (1-D) array, and encoding the data storage device with the 1-D array onto an optical data storage device.

Further disclosed herein is a method related to a computer program product for decoding data captured from an optical data storage device in a computer environment, the computer program product comprising a storage medium readable by a processing circuit and storing instructions for execution by the processing circuit for facilitating a method, and the method comprising, receiving encoded data from a captured image of an optical data storage device, decoding the encoded data into a one-dimensional (1-D) array, decoding the 1-D array into a two-dimensional (2-D) white noise matrix, and decrypting the 2-D matrix with a double random phase decryption and a phase key into an image.

BRIEF DESCRIPTION OF THE DRAWINGS

The following descriptions of embodiments should not be considered limiting in any way. With reference to the accompanying drawings, like elements are numbered alike.

DETAILED DESCRIPTION OF THE INVENTION

An optically encoded identification tag for storing double phase encrypted data that can be remotely captured, accurately read, and authenticated in real time has several potential applications. Embodiments may focus on a particular application, specifically the identification and authentication of a tag containing a vehicle identification number (VIN). However, many other applications are possible. More specifically, the application of the identification tag to a top or front of vehicles may be used for the purpose of being captured by an imaging system from above or from in front of the vehicle. The imaging systems may be mounted above a vehicle entrance to a facility or aboard an aerial surveillance aircraft, for example. In these examples, the orientation and distance of the imaging system relative to the identification tag will vary. The varying orientation will cause rotational distortions and the varying distance will create scale distortions. Embodiments will describe how to compensate for such distortions.

Figure 1:
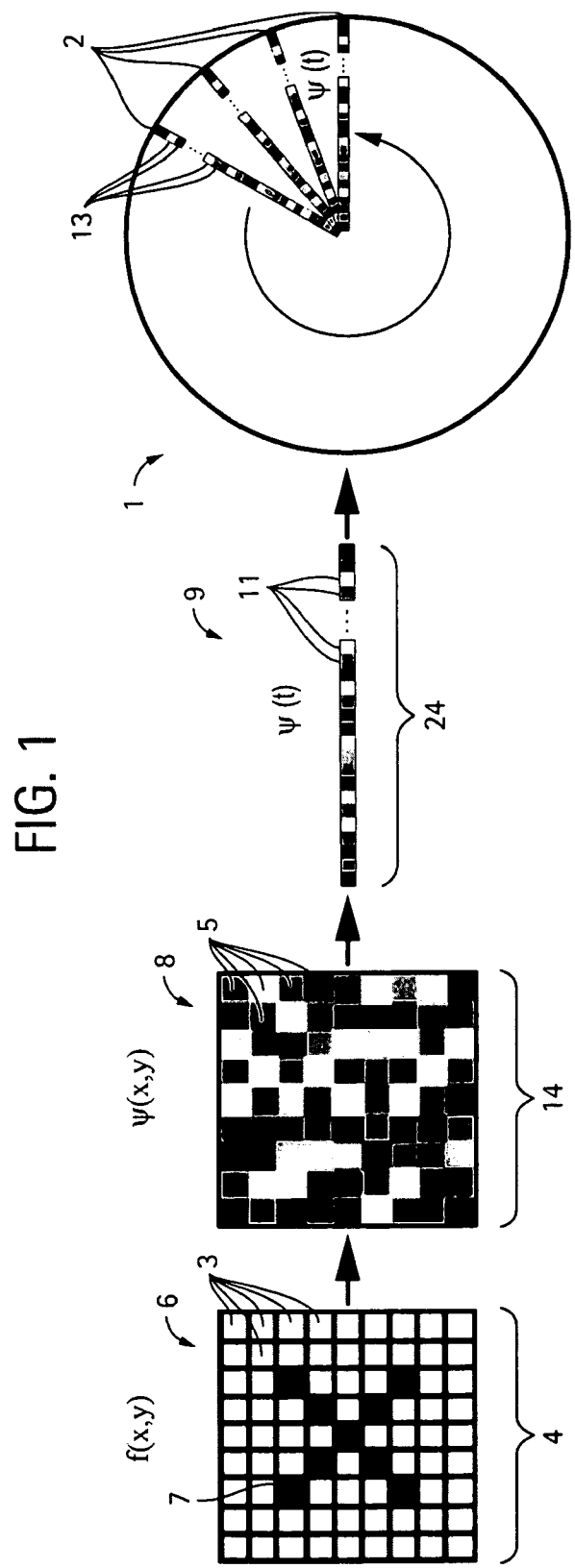
FIG. 1, depicts an explanatory diagram of various formats in which data may reside.

Referring to FIG. 1, an explanatory diagram of various formats in which data may reside is shown. Original data (hereafter original signature) 4, an image, is digitized into a two-dimensional (2-D) matrix 6, f(x,y), of image pixels 3 of varying gray scale magnitude. For purposes of simplification a vehicle identification number is represented here as the letter 'X' 7 for the original signature 4. The two-dimensional matrix 6 of the original signature 4 is encrypted with a double random phase encoding encryption, to be discussed in more detail below, that encodes the two-dimensional matrix 6 into a 2-D white stationary noise (gray scale) matrix 8, $\psi(x, y)$, also referred to as an encrypted signature 14. The two-dimensional white noise matrix 8 may comprise encrypted signature pixels 5 of varying gray scale magnitude representing amplitude and/or phase of a complex value. The encrypted signature 14 is mapped into a vector notation signature 24, which is a one-dimensional (1-D) array 9 of vector pixels 11 that have a one-to-one correlation to the encrypted signature pixels 5 of the encrypted signature 14. It is this vector notation signature 24 made of vector pixels 11 that is applied to a rotation invariant identification (ID) tag 1 in a series of radial pixels 13 that correlate on a one-to-one basis with vector pixels 11.

The process just described is completely reversible such that a vector notation signature 24 can be decrypted to determine the original signature 4. To decrypt a vector notation signature 24 requires a decryption key. Without the decryption key decrypting the vector notation signature 24 is nearly impossible.

In addition to decrypting the data contained on the rotation invariant ID tag 1, an authentication may be performed to verify the rotation invariant ID tag 1 is not a counterfeit. This authentication process will be discussed in more detail later.

Double Phase Encryption and Decryption

For security purposes an optical double random phase encoding encryption technique is employed. Image encryption is achieved by using two random phase codes that convert the input information into complex white stationary noise. One phase code is used in the input plane, and the second phase code is used in the Fourier plane. Let f(x, y) be the original signature 4 to be encrypted that is normalized ($0 \leq f(x, y) \leq 1$) and sampled to have a total number of pixels N. The coordinates in the spatial and in the frequency domain are (x, y) and ($\mu$, $\nu$), respectively. Let p(x, y) and b($\mu$, $\nu$) be two independent white noise sequences, uniformly distributed in the interval [0, 1]. Two operations are performed to obtain the encrypted signature 14. First, the original signature 4, f(x, y), is multiplied by the input phase mask exp[i2$\pi$p(x, y)]. Then, this product is convolved by the impulse response h(x, y) which has a phase-only transfer function, H($\mu$, $\nu$)=exp[i2$\pi$b ($\mu$, $\nu$)], denoted as Fourier plane phase mask. Thus, the encrypted signature 14, $\psi$(x, y), is given by:

$$\psi(x, y) = \{f(x, y)\exp[i2\pi p(x, y)]\} * h(x, y) \quad (1)$$

where * denotes the convolution operation. The encoding method can be implemented optically or electronically. In either case, the complex amplitude encrypted signature 14, $\psi$(x, y), must be represented with both the amplitude and the phase.

In order to decrypt the encrypted signature 14, $\psi$(x, y), its Fourier transform must be multiplied by the phase mask exp[$-$i2$\pi$b($\mu$, $\nu$)] and then inverse Fourier transformed, which produces:

$$f(x, y)\exp[i2\pi p(x, y)] = IFT\{FT[\psi(\mu, \nu)]\exp[-i2\pi b(\mu, \nu)]\}. \quad (2)$$

Finally, multiplication by the phase mask exp[$-$i2$\pi$p(x, y)] will recover the original signature 4, f(x, y). Alternatively, because f(x, y) is real and positive, the signature may be recovered by computing the magnitude of f(x, y) exp[i2$\pi$p(x, y)] or by using an intensity sensitive device such as a video camera or CCD camera. Thus, the encrypted signature 14 can only be decrypted when the corresponding phase code exp [i2$\pi$b($\mu$, $\nu$)], referred to as a key, is used for the decryption. Double phase encoding is employed because it has been shown to be an appropriate encoding procedure for gray scale images, and it has a reliable performance in situations where noise, occlusion or other degradations may alter the ciphered information.

Distortion Invariant ID Tags

After the original signature 4 is encrypted by using the double phase encoding technique, the encrypted signature 14, $\psi$(x, y) is written in a simpler form for application to the rotation invariant ID tag 1 in a way that an imaging system 20 may be able to capture the optically sensible image and decode it even if the captured code is rotated or has a different scale. The following embodiments will be discussed specifically; a rotation invariant ID tag, a scale invariant ID tag and a combined rotation and scale invariant ID tag.

Rotation Invariant ID Tag

Figure 2:
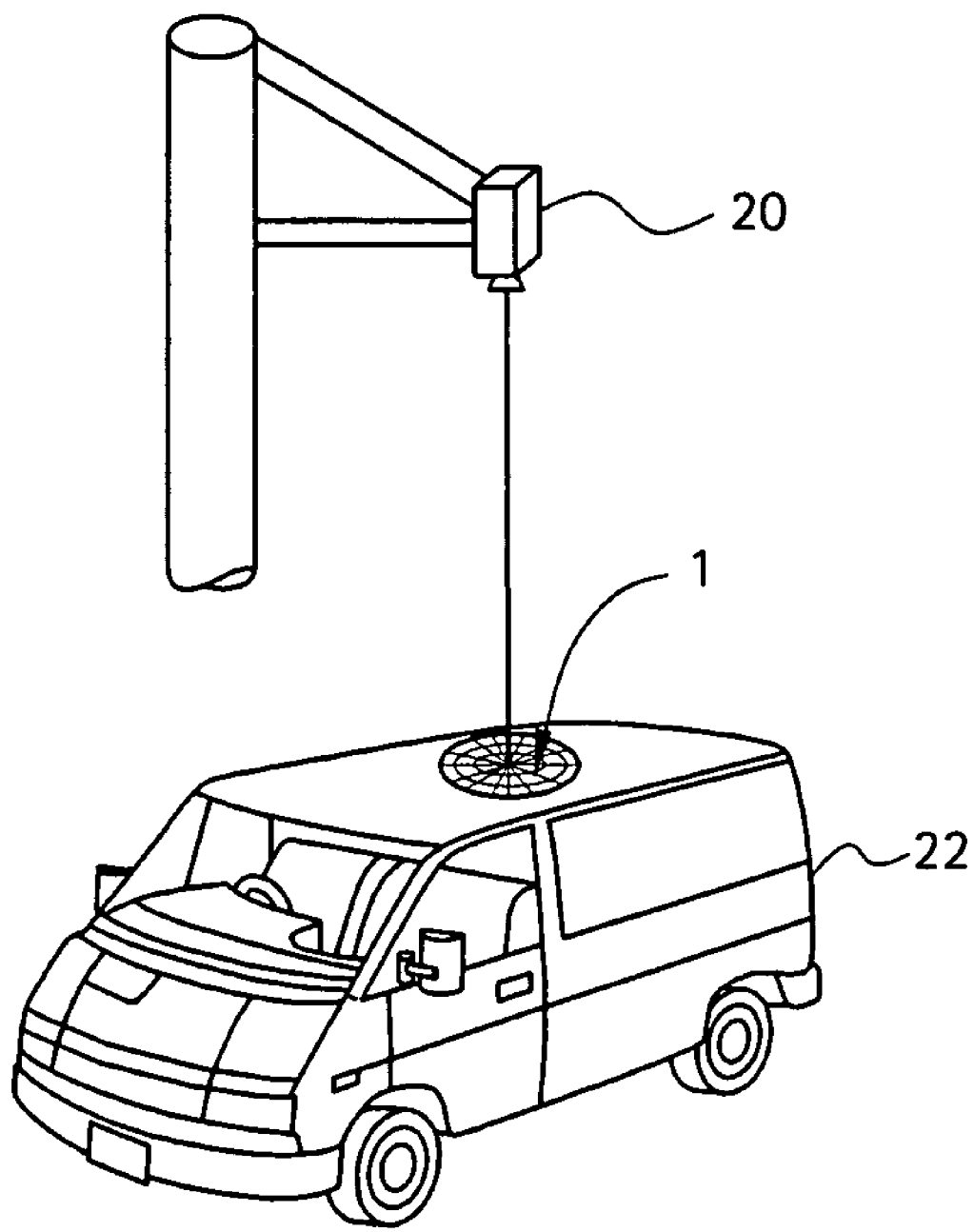
FIG. 2 depicts a diagrammatical view of an image capturing system.

Referring to FIG. 2, let us suppose that the imaging system 20 is fixed in a given position, for example above a road intersection, and it captures the optical codes of the rotation invariant ID tag 1 located on the roofs of the vehicles 22 coming from different directions. In this situation, the codes are always going to be captured at the same scale but distorted by in plane rotations. Thus, the rotation invariant ID tag 1 needs to be rotation invariant.

The format of the vector notation signature 24, a one-dimensional array 9, $\psi$(t) lends itself well for application to the rotation invariant ID tag 1. The one-dimensional array 9, $\psi$(t), is created by rewriting encrypted signature pixels 5 of a two-dimensional white noise matrix 8 of an encrypted signature 14 $\psi$(x, y), into a one-dimensional array 9 of vector pixels 11 in the vector notation $\psi$(t) where t=1, 2 ... N, and N is the total number of vector pixels 11. Remotely reading a one-dimensional array 9 is significantly easier than reading the two-dimensional array of the white noise matrix 8, $\psi$(x,y), since the one-dimensional array 9 can be arranged on the rotation invariant ID tag 1 in different methods. One such method is to orient the one-dimensional array 9 in a radial vector 2 orientation as shown in rotation invariant ID tag 1 of FIG. 1. In rotation invariant ID tag 1 the sequential vector pixels 11 of the vector notation signature 24 are applied repeatedly, radial pixel 13 by radial pixel 13, in radial vectors 2 immediately adjacent to each other until a full circle is completed. The resulting rotation invariant ID tag 1 contains concentric circles of radial pixels 13 that correspond with vector pixels 11 such that any radial line can be used to read vector notation signature 2, $\psi$(t), which contains a full copy of the one-dimensional array 9.

The vector notation signature 24 can be applied to the rotation invariant ID tag 1 in a continuous manner or as discrete radial vectors 2. For continuous functions, the rotation invariant ID tag $C_{RI}$(r, $\theta$) can be written as:

$$C_{RI}(r, \theta) = C(r) = \psi(t) \text{ for } \theta \in [0, 2\pi]. \quad (3)$$

For discrete matrices, it can be written as:

$$C_{RI}(m,n) = C_{RI}([\sqrt{(m-m_0)^2 + (n-n_0)^2}]) = \psi(t), \quad (4)$$

where [•] denotes the nearest integer towards zero and ($m_0$, $n_0$) are the center coordinates of $C_{RI}$(m, n).

Once the imaging system 20 captures the rotation invariant ID tag 1 from a given distance, the vector notation signature 24 of the one-dimensional array 9 $\psi$(t) can be decoded by reading out the information of the code in any radial direction, from the center to the exterior of the code. Not only is a single radius taken into account for decoding, but an average or mean value from several radii is computed to increase noise robustness. Radial pixels 13 could be written back into the white noise matrix 8 prior to decoding the encrypted signature 14 $\psi$(x, y) by using the decryption technique described above. Following this procedure, the encrypted signature 14 will be recovered whether the rotation invariant ID tag 1 is captured in its original orientation or its rotated format.

Scale Invariant ID Tag

Figure 3:
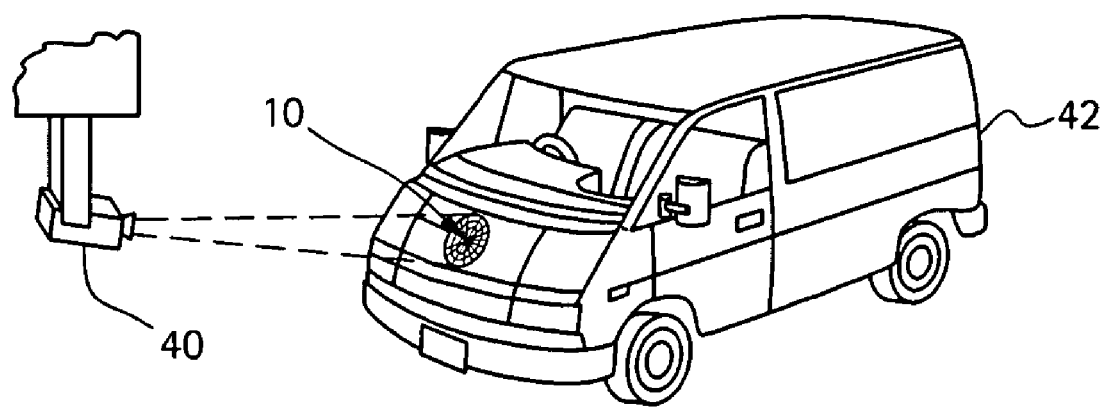
FIG. 3 depicts a diagrammatical view of an alternate image capturing system.

FIG. 3 depicts an alternate situation, in which, the imaging system 40 is fixed to view the front of approaching vehicles 42, for example in a parking lot entrance. The vehicles 42 approach the imaging system 40 from the same direction, but the distance from the imaging system 40 to the vehicle 42 and scale invariant ID tag 10 will vary within a range. In this case, an important requirement for a scale invariant ID tag 10 is to be invariant to scale.

Figure 4:
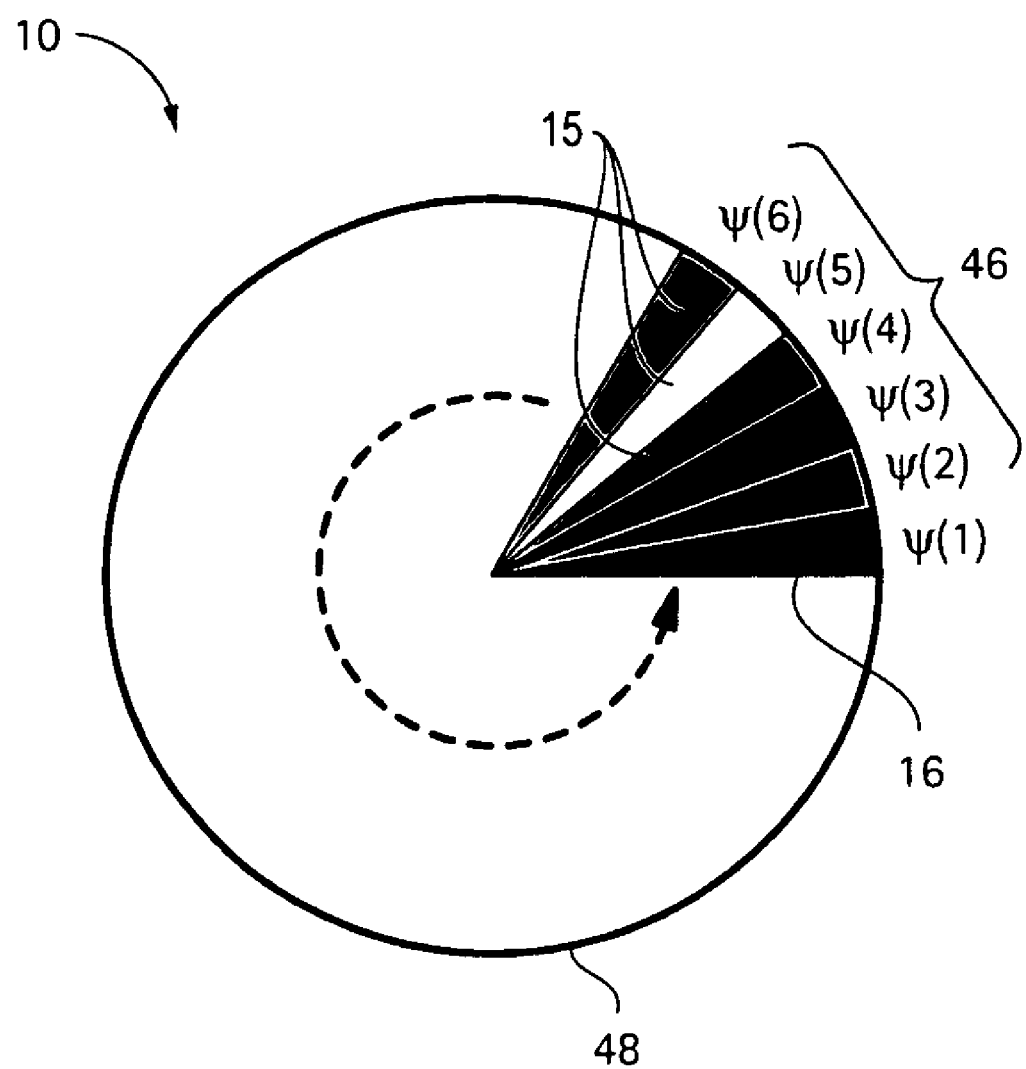
FIG. 4 depicts an explanatory diagram of an embodiment of a scale invariant ID tag.

Referring to FIG. 4, an explanatory diagram of a scale invariant ID tag 10 is shown. The vector notation signature 24 is applied to the scale invariant ID tag 10 by rearranging the information of the vector notation signature 24, into sectors 46 of a circle 48. More specifically, each vector pixel 11 is mapped to a corresponding sector 46 such that the sector pixels 15 that makes up each sector 46 match the vector pixels 11 of the vector notation signature 24. The sequence of the vector pixels 11 in the vector notation signature 24 is mapped to the sequence of sectors 46 in the scale invariant ID tag 10 in a particular direction of rotation, for example counter-clockwise. The vector notation signature 24 can be mapped to the sectors 46 either as a continuous function or discrete matrices.

For continuous functions, it can be written as:

$$C_{SI}(r, \theta) = C\left(\frac{(N-1)}{2\pi}\theta\right) = \psi(t) \text{ for } \forall \, r. \tag{5}$$

In the case of discrete matrices, it can be written as:

$$C_{SI}(m, n) = \left(\left[\frac{(N-1)}{2\pi}\left(\pi + \arctg\left(\frac{n-n_0}{m-m_0}\right)\right)\right]\right) = \psi(t). \tag{6}$$

The encrypted signature 14 in vector notation signature 24 ψ(t) is recovered by reading out the sector pixels 15 of the scale invariant ID tag 10 in a circular direction, for example counterclockwise, provided that the starting pixel 16 of the code occupies a known location. This requirement is satisfied if the optical codes are always captured from its original orientation. To minimize errors in the reading process, we take into account the average or mean value of several sector pixels 15 located in the same sector in the radial direction. Afterwards, the signature is written in the two-dimensional white noise matrix 8 notation ψ(x, y) and decrypted to recover the original signature 4 as described earlier. Then, the code will be recovered whether the scale invariant ID tag 10 is captured in its original size or it is scaled.

Figure 5:
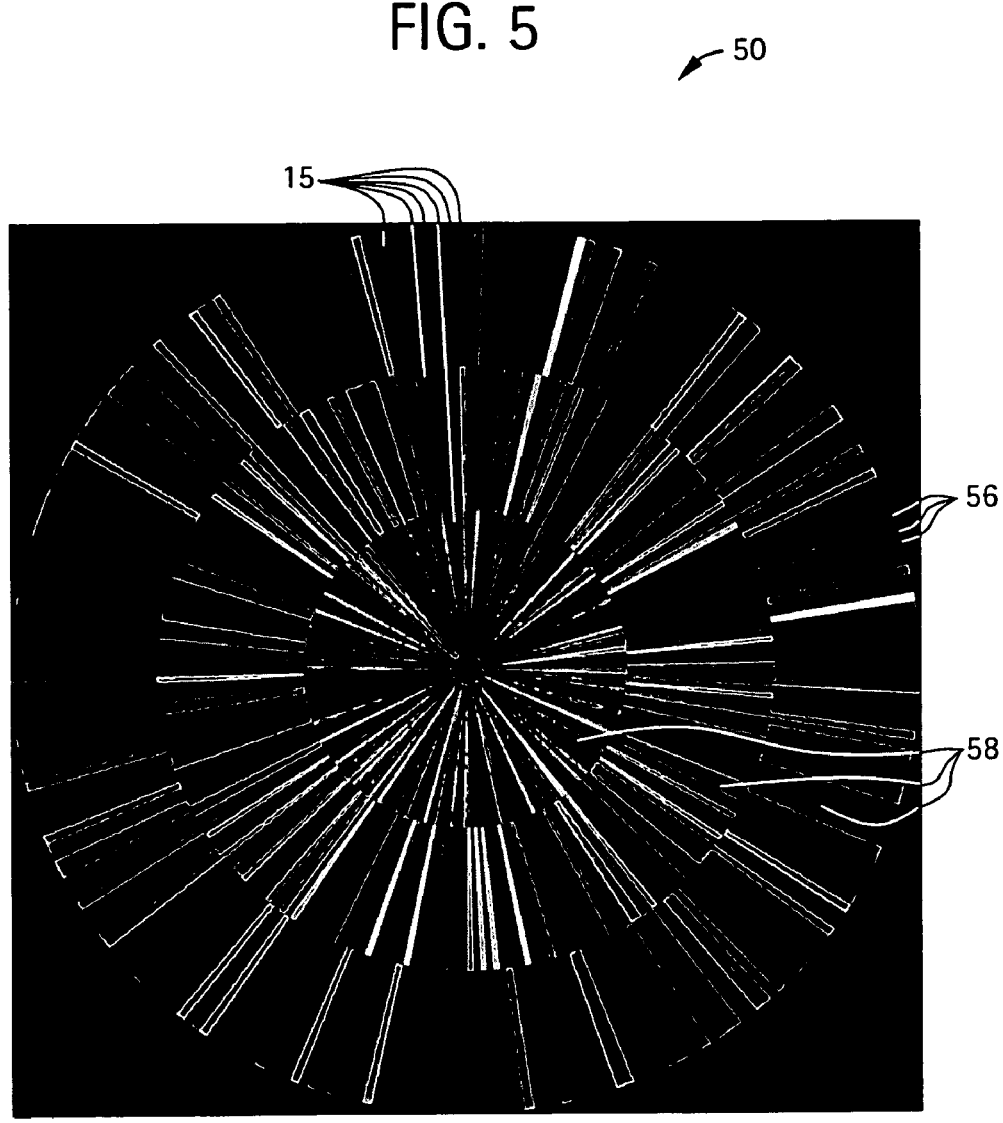
FIG. 5 depicts an explanatory diagram of an alternate embodiment of a scale invariant ID tag.

In another embodiment, depicted in FIG. 5, the number of sector pixels 15 stored in a scale invariant ID tag 50 can be increased by distributing sectors 56 into concentric circles 58, thereby increasing the number of sectors 56 available for storing data. The vector notation signature 24 could then be continued from one sector to another in a concentric circle 58 of different diameter for example. The procedure for recovering the vector notation signature 24 will remain the same except for taking into account the size of the concentric circles 58.

Rotation and Scale Invariant ID Tag

Figure 6:
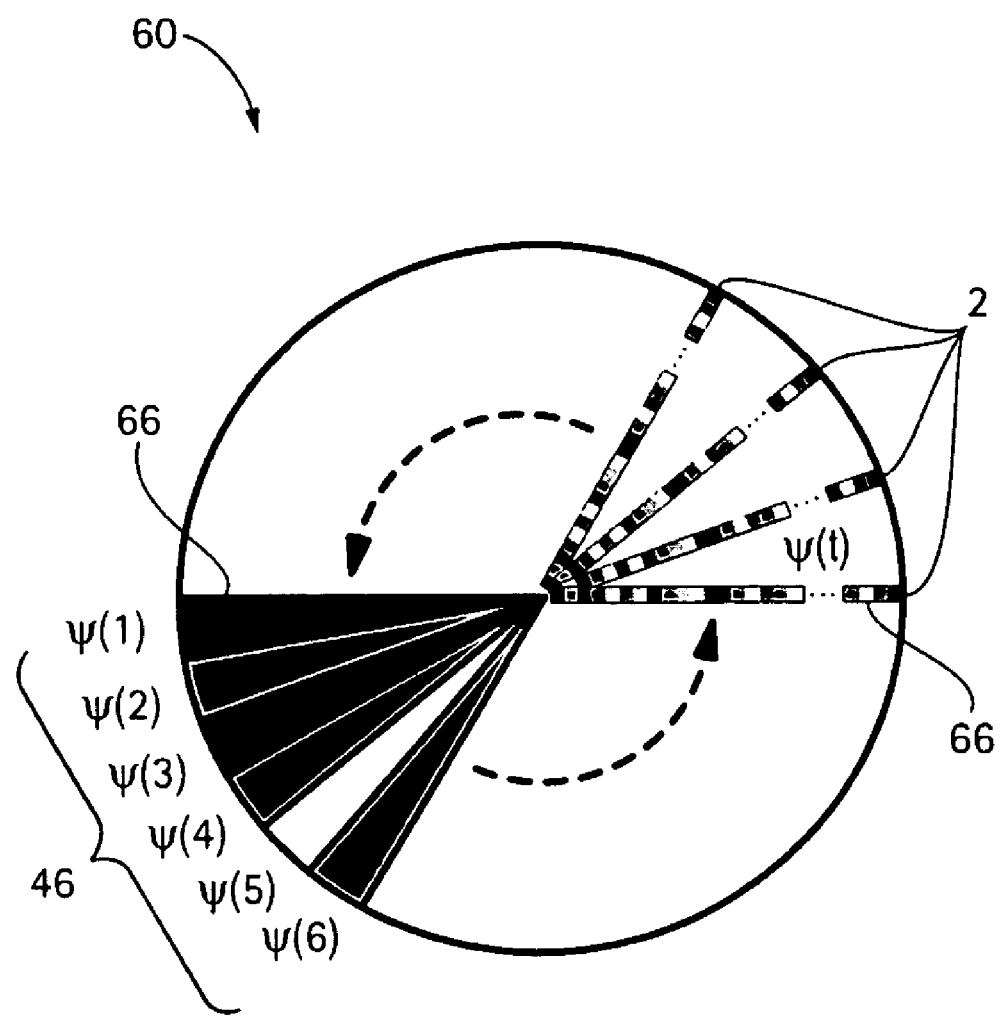
FIG. 6 depicts an explanatory diagram of an embodiment of a rotation and scale invariant ID tag.
Figure 7:
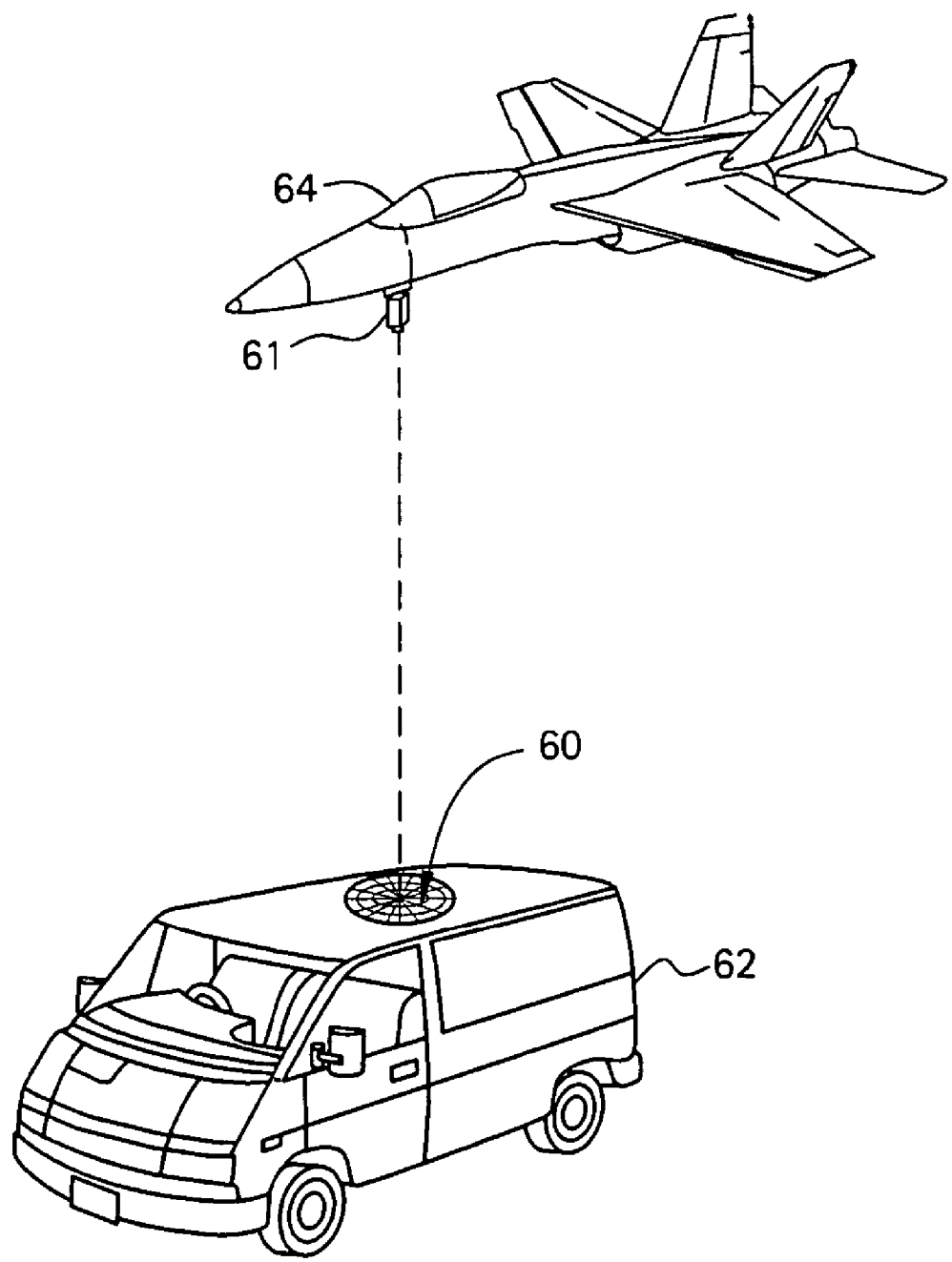
FIG. 7 depicts a diagrammatical view of an alternate image capturing system to that of FIG. 3.

Referring to FIG. 6, a rotation and scale invariant ID tag 60 is shown. The rotation and scale invariant ID tag 60 is useful when an imaging system 61 captures an image with both scale and rotational distortions as could happen if the imaging system 61 is located on a moving platform, such as an aircraft 64 for example, while capturing images of a rotation and scale invariant ID tag 60 attached to a vehicle 62 as shown in FIG. 7. The rotation and scale invariant ID tag 60 incorporates features from both the rotation invariant ID tag 1 and the scale invariant ID tag 10. Specifically, rotation and scale invariant ID tag 60 may have radial vectors 2, each of which contain a full copy of the complete vector notation signature 24; and sectors 46, that when read in sequence counterclockwise, for example, along a circular arc also contain a full copy of the complete vector notation signature 24. The rotation and scale invariant ID tag 60 may be divided in half, for example, with one half encoded with the radial vectors 2 and the other half encoded with the sectors 46.

Mathematically it can be described for discrete functions as:

$$C_{RSI}(m, n) = \tag{7}$$
$$\begin{cases} C_{RI}\left(\left[\sqrt{(m-m_0)^2 + (n-n_0)^2}\right]\right) = \psi(t), \text{ for } (n-n_0) > 0 \\ C_{SI}\left(\left[\frac{(N-1)}{2\pi}\left(\pi + \arctg\left(\frac{n-n_0}{m-m_0}\right)\right)\right]\right) = \psi(t), \text{ for } (n-n_0) \leq 0 \end{cases}$$

The decoding of a vector notation signature 24 from the rotation and scale invariant ID tag 60 is performed on the image after a border 66 between the two encoded halves is detected. This may be achieved by computing the gradient over radial directions of the rotation and scale invariant ID tag 60 for different angles. For the radial vector 2 encoded half (rotational invariant half) the radial gradient will be noticeable, whereas, for the sector 46 encoded half (scale invariant half) the radial gradient will be almost zero. Therefore, angles with large values for the gradient correspond to the rotation invariant half whereas angles with almost null gradient values correspond to the scale invariant half. These gradient differences allow the determination of an angle that defines the boarder 66 separating the radial vector 2 encoded half from the sector 46 encoded half. Once the border 66 is determined the vector notation signature 24 code can be read out in the same methods as discussed earlier. A mean value from several readings, retrieved from both halves, can be used to increase the robustness to distortion and noise.

Figure 8:
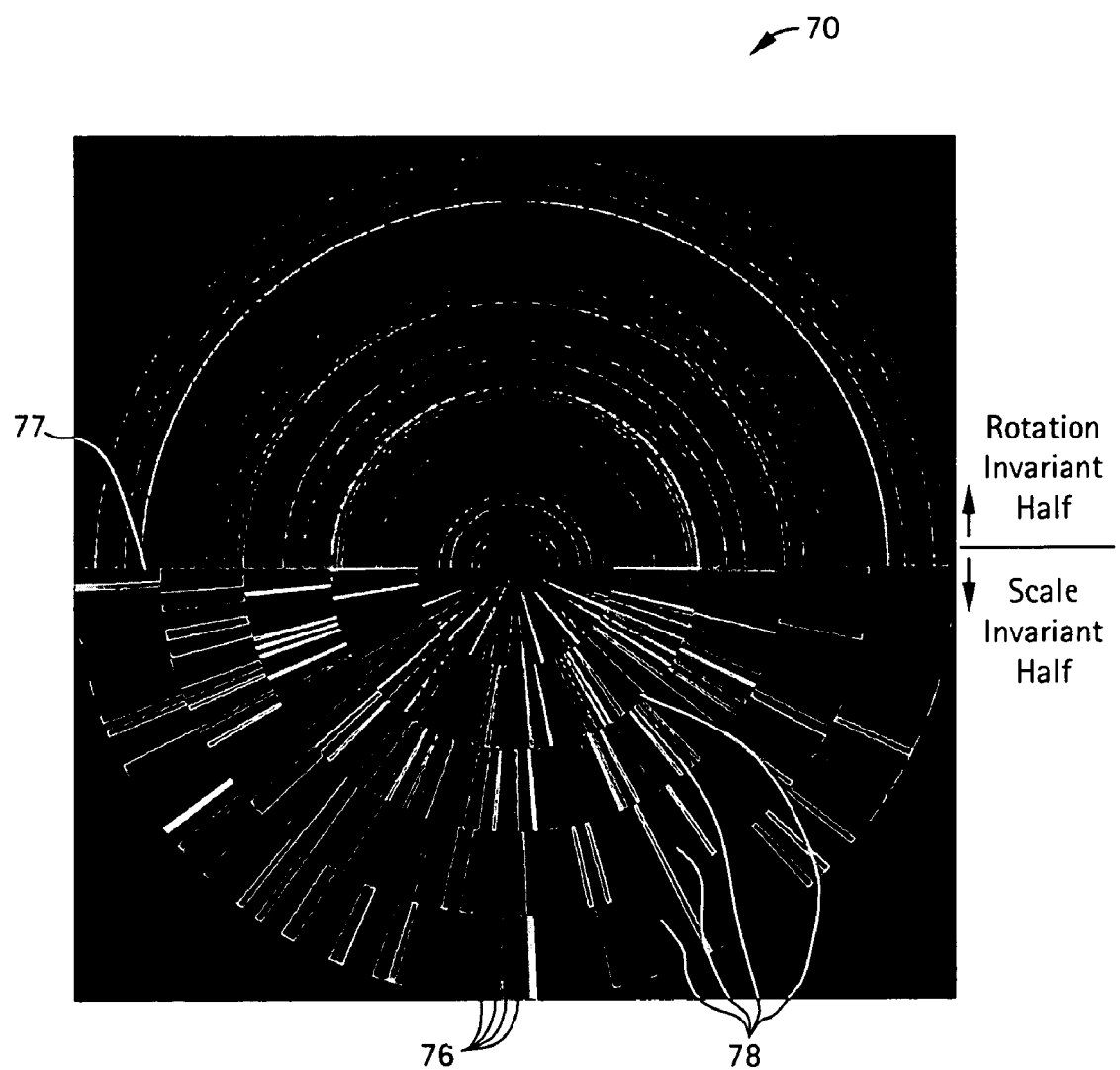
FIG. 8 depicts an explanatory diagram of an alternate embodiment of a rotation and scaled invariant ID tag to that of FIG. 6.

In another embodiment, depicted in FIG. 8, the amount of data stored in a rotation and scale invariant ID tag 70 can be increased by distributing sectors 76 of the scale invariant half into concentric circular arcs 78. The encoded vector notation signature 24 could then be continued from one sector 76 to another in an adjacent circular arc 78 of different diameter for example. The procedure for recovering the vector notation signature 24 will remain the same except for taking into account the size of the concentric circular arcs 78. Detection of a border 77 between a rotation invariant half and a scale invariant half of the rotation and scale invariant ID tag 70 would require looking at the radial gradient only in specified diametrical regions to avoid misreading the separate sectors 76 of concentric circular arcs 79 as signature pixel gradient readings.

Correlation-Based Signature Verification

The final step for the imaging system will be the verification of the captured information in order to identify a given vehicle. The decrypted signature f(x, y) is compared to a previously stored reference signal r(x, y). Comparison of these two functions is based on nonlinear correlation. The decoded information f(x, y) and the reference signature r(x, y) are both Fourier transformed, nonlinearly modified, and multiplied in the frequency domain. Correlation between the input and the reference signals is obtained by inverse Fourier transforming this product. Let $|F(\mu, \nu)|$ and $|R(\mu, \nu)|$ be the modulus of the Fourier transforms of f(x, y) and r(x, y), respectively, and $\phi_F(\mu, \nu)$ and $\phi_R(\mu, \nu)$ denote their phase distribution in the frequency domain. The nonlinear correlation is obtained by using:

$$c(x, y) = IFT\{|F(\mu, \nu)R(\mu, \nu)|^k \cdot \exp[i(\phi_F(\mu, \nu) - \phi_R(\mu, \nu))]\}. \tag{8}$$

In a k'th-law nonlinear processor, parameter k defines the strength of the applied nonlinearity. The nonlinearity will determine performance features of the processor, such as its discrimination capability, noise robustness, peak sharpness, etc. and it can be chosen according to the performance required for a given recognition task. Optimum nonlinear transformations can be obtained to enhance the detection process by optimizing a performance metric. We use k'th-law nonlinearity for computational efficiency. Correlation-based detection is feasible when an output peak above a noise floor is obtained. Evaluation of correlation output requires the analysis of different parameters or metrics. We consider, as a measure of the system discrimination capability the cc/ac metric, which is the ratio between the maximum peak value of the correlation output, cc, and the maximum autocorrelation value, ac, for the reference signature. Similarity between the decoded information and the reference signature will be greater if the cc/ac ratio approaches the value of unity. Another metric used in this work is the peak-to-correlation energy (PCE). This parameter usually indicates the sharpness and height of the output correlation peak. Thus, the higher the PCE value is, the easier the detection of a given object becomes.

Finally, to evaluate noise robustness of the proposed system we use signal-to-noise ratio (SNR). A series of experiments were performed and a SNR was computed by using independent noise samples over 250 runs.

Experiential Identification Results

Figure 10:
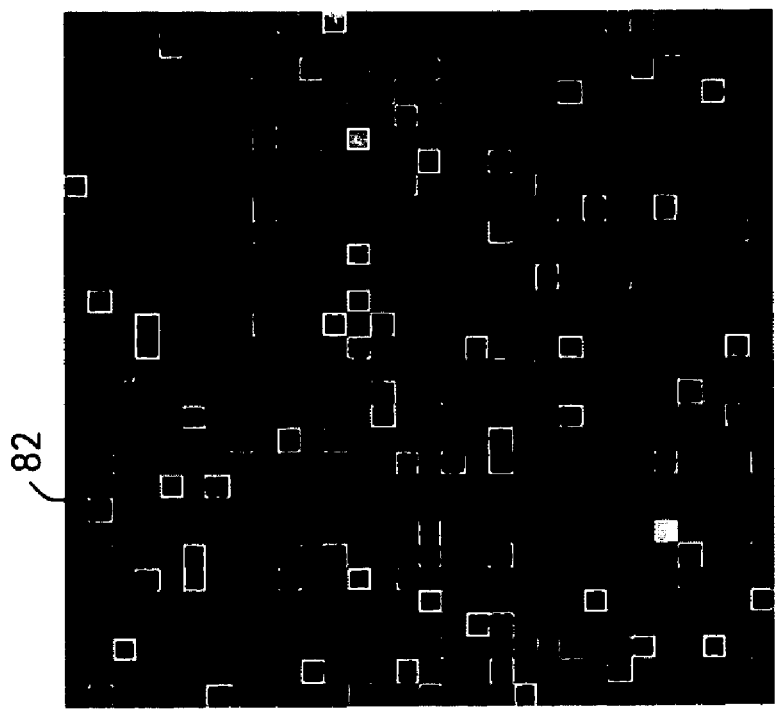
FIG. 10 depicts an encrypted image of the signature of FIG. 9.
Figure 9:
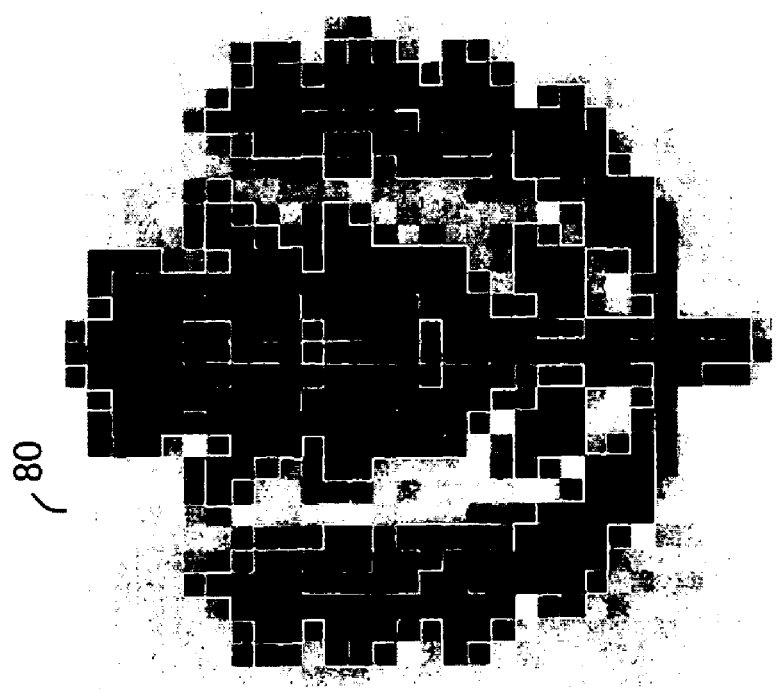
FIG. 9 depicts an experimental signature used in evaluation trials.
Figure 12:
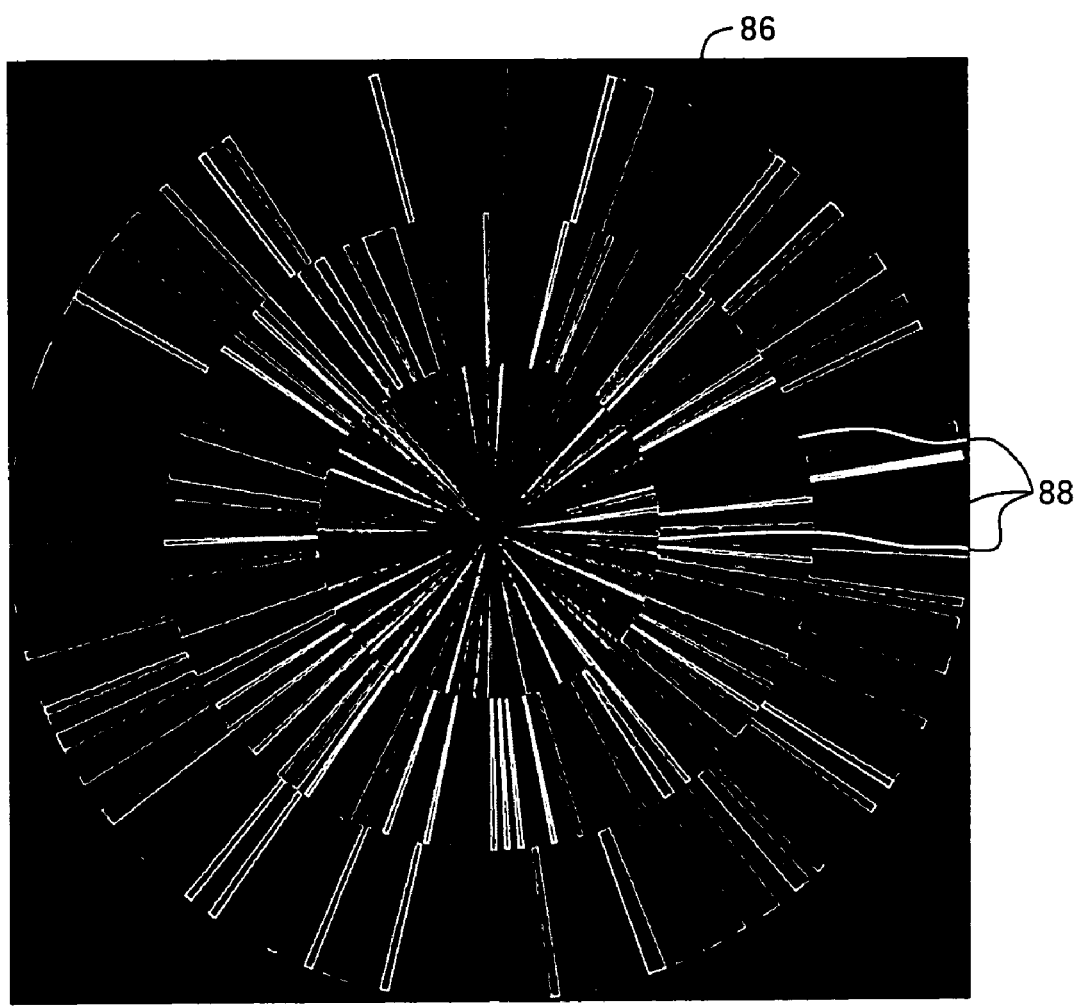
FIG. 12 depicts a scale invariant ID tag of the signature of FIG. 9 disclosed herein.
Figure 13:
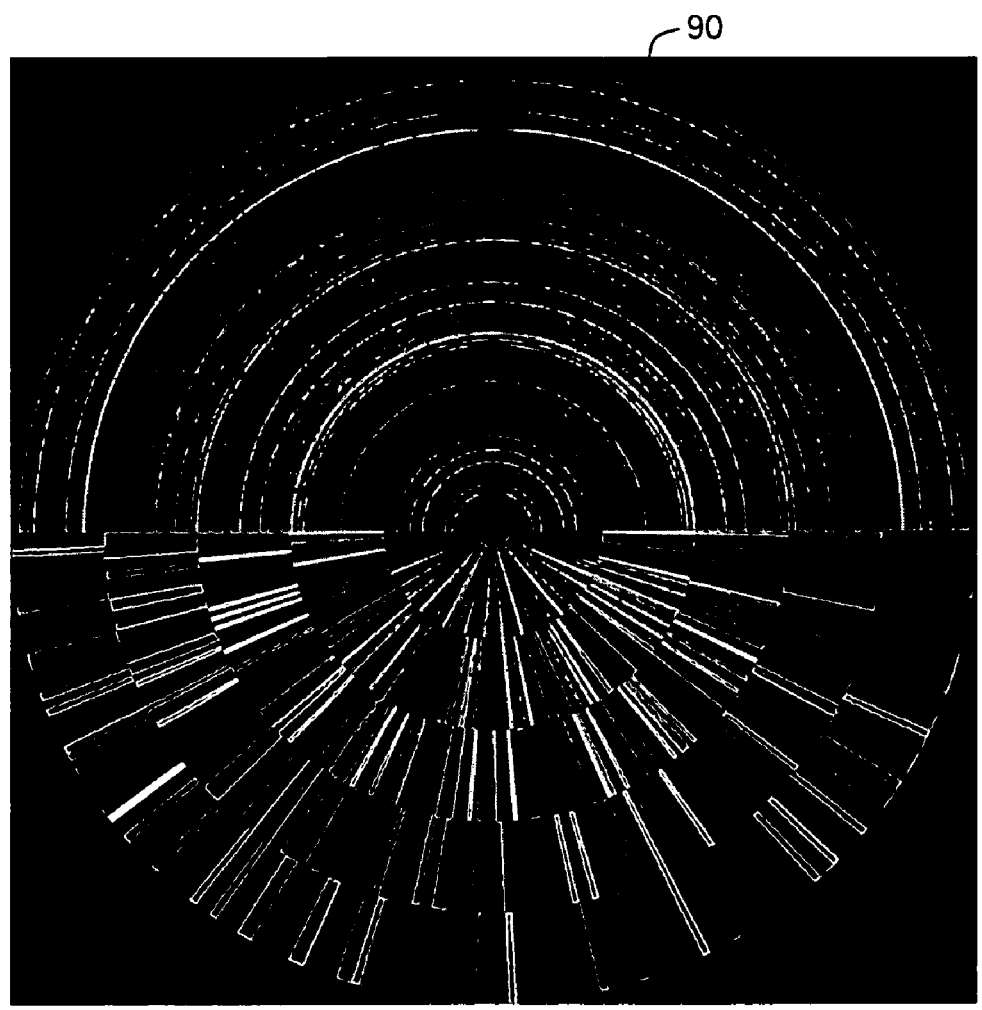
FIG. 13 depicts a rotation and scale invariant ID tag of the signature of FIG. 9 disclosed herein.

Experiments were carried out to demonstrate the feasibility of some proposed distortion invariant ID tags, the examples are not limiting and other embodiments are possible. The reference signature 80 used to verify an embodiment of the identification system is shown in FIG. 9 and its encrypted image 82, computed by using the double phase encoding technique, is shown in FIG. 10. Distortion invariant ID tags were synthesized from this encoded information. Following the procedure described above in the section regarding distortion invariant ID tags, a rotation invariant ID tag 84 was synthesized by using equation (4) and it is displayed in FIG. 11. FIG. 12 represents a scale invariant tag 86 from equation (6) that has three concentric circles 88. FIG. 13 shows the rotation and scale invariant ID tag 90 synthesized using equation (7). The following subsections present some relevant numerical results obtained in the experiments.

Rotation Invariant ID Tag

Figure 11:
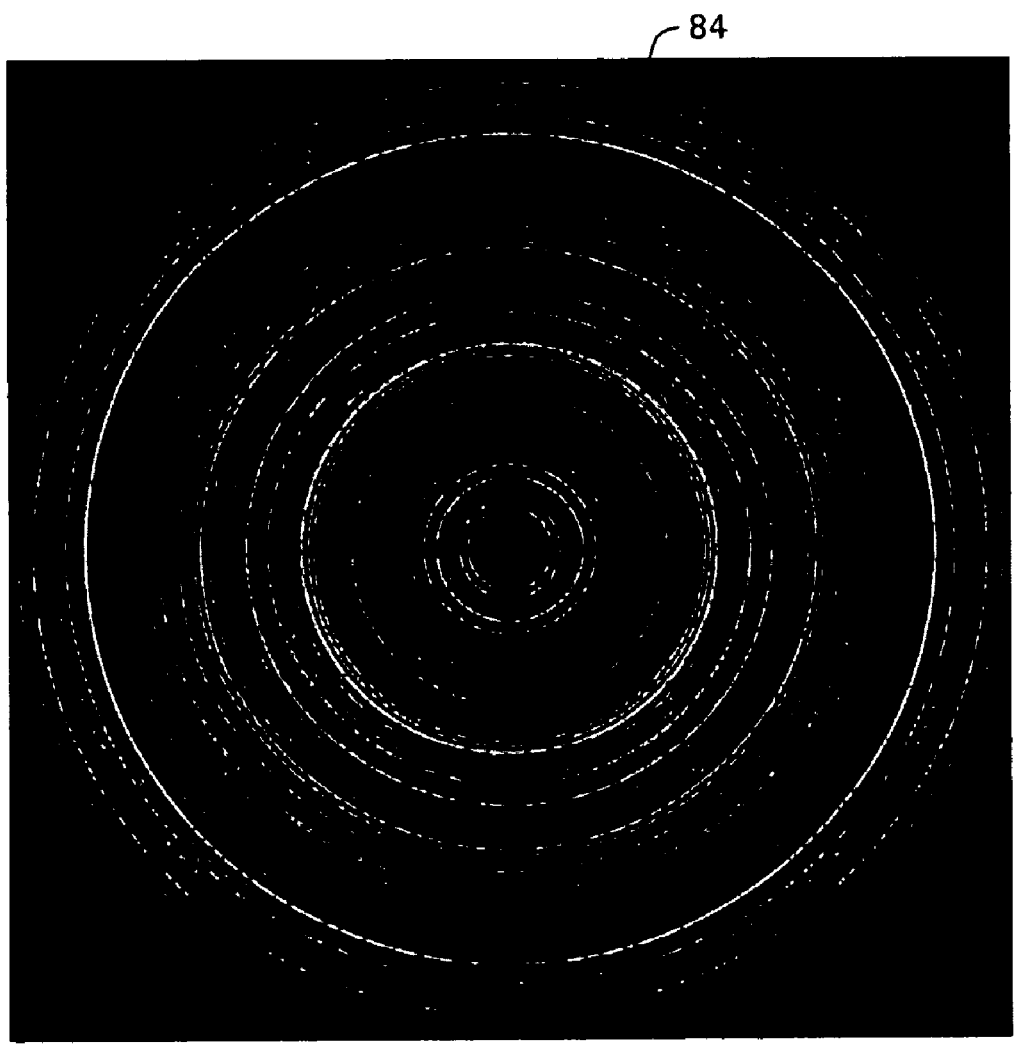
FIG. 11 depicts a rotation invariant ID tag of the signature of FIG. 9 disclosed herein.
Figure 14:
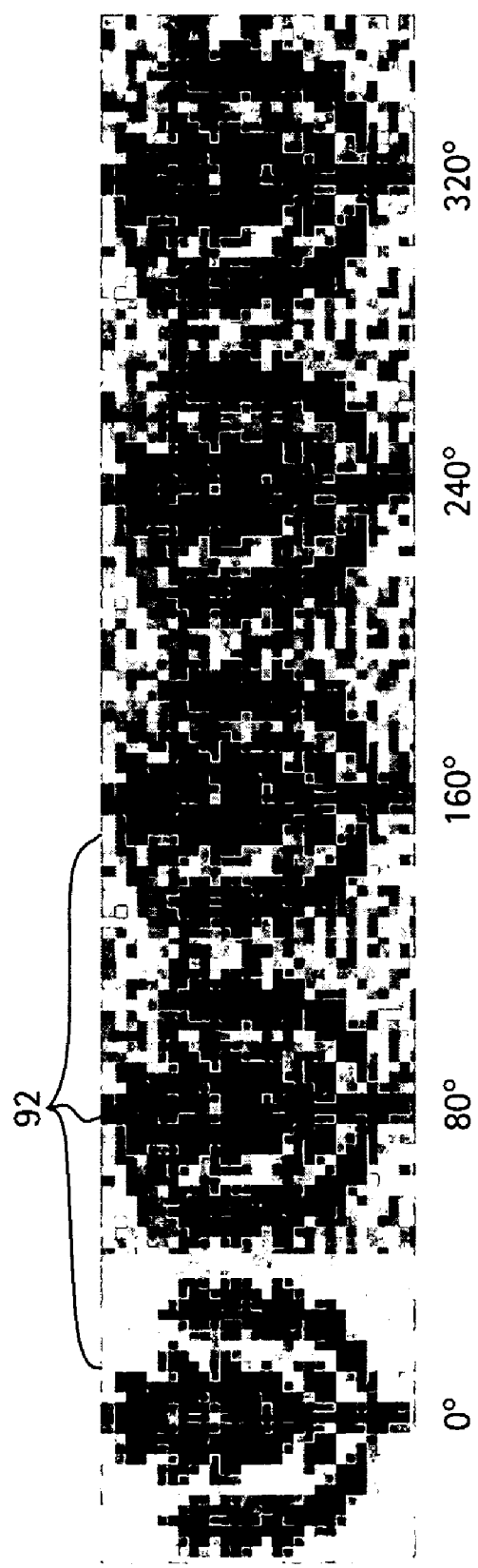
FIG. 14 depicts five decrypted images from the rotation invariant ID tag of FIG. 11 captured at increments of 80 degrees.

First, the rotation invariance of a verification system for the rotation invariant ID tag 84, in accordance with an embodiment of the invention shown in FIG. 11, is tested, which is designed to achieve rotation invariance. The rotation invariant ID tag 84 is digitally rotated from 0 to 360 degrees in steps of 20 degrees. For all the rotated rotation invariant ID tags 84, encrypted signatures in vector notation ψ(t) are recovered following the procedure described in the above subsection titled Distortion Invariant ID Tags Rotation Invariant ID Tags, and the decrypted signatures are obtained by using the double phase decryption technique. Some of the decrypted signatures 92, those corresponding to 80-degree steps of rotation, are depicted in FIG. 14. Signatures are correctly decoded in all the cases even though some noise is overlapping with the recovered images. To verify whether the vehicle is an authorized signal, the recovered signatures should be compared with a previously stored reference signature 80 (FIG. 9). Different degrees of nonlinearity are applied to compare their corresponding recognition results. Recognition results 94 using a correlation-based processor are plotted in FIG. 15. In this figure, both the cc/ac ratio and the PCE parameter are displayed together versus the rotation angle of the captured ID tag.

Results obtained for the cc/ac ratio (solid lines in FIG. 15) show that value of k=1, which stands for a linear correlation, corresponds to a more distortion-tolerant system. The cc/ac ratio remains nearly constant and close to unity for different rotation angles of the ID tag. Value of k=0, which corresponds to a recognition system with a high discrimination capability, detects small changes in the analyzed image implying a rapid decrease of the cc/ac ratio. Finally, intermediate values of k, such as k=0.5, correspond to an intermediate behavior between the two aforementioned extreme cases.

It should be noted that for all the nonlinearities tested, the parameter cc/ac has its maximum values for rotation angles of 0°, 180°, and 360°. This is due to the fact that for these angles, interpolation algorithms are not needed to digitally rotate an image.

Figure 15:
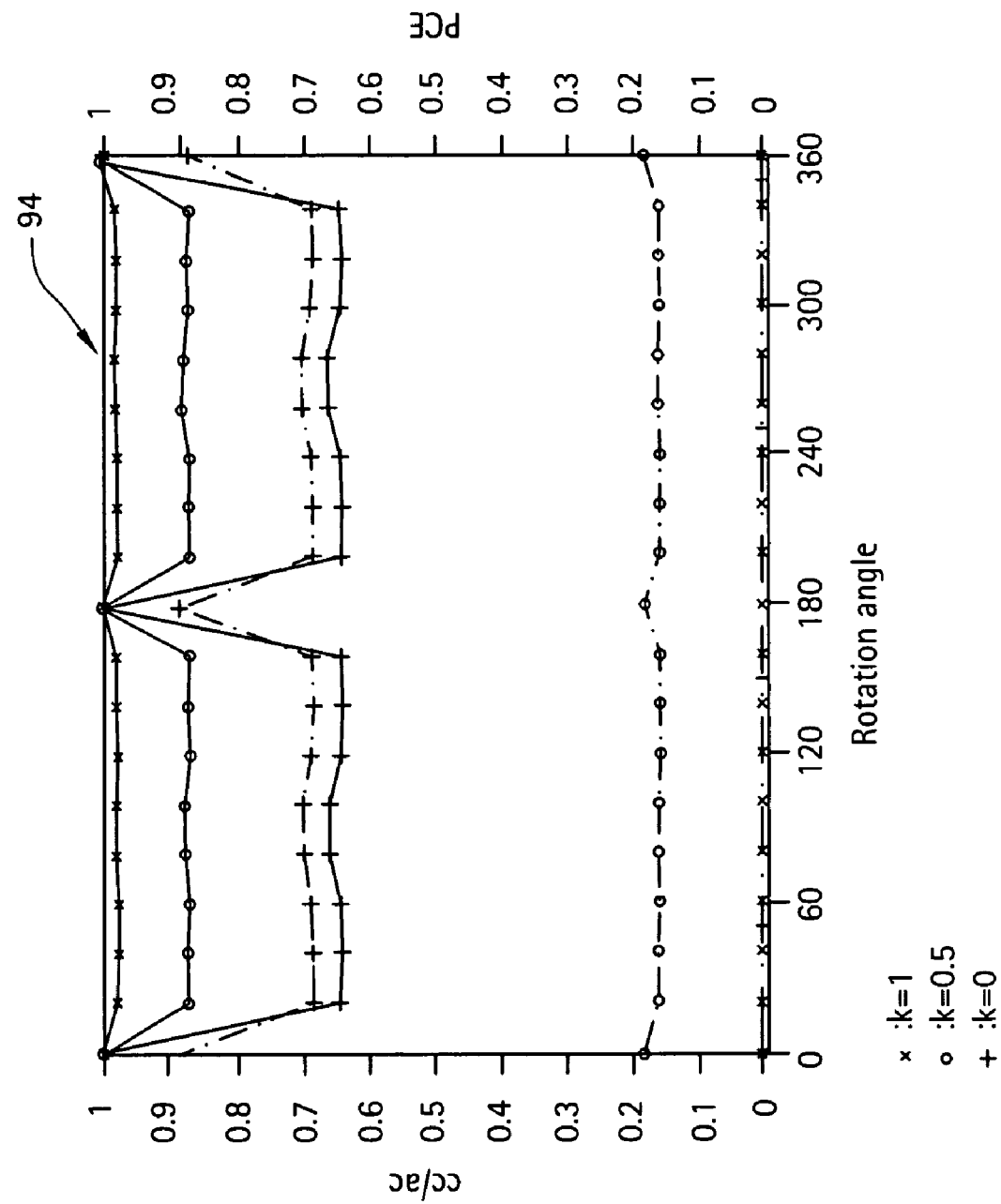
FIG. 15 a plot of discrimination ratio cc/ac and peak-to-correlation energy (PCE) versus rotational angle for the rotation invariant ID tag of FIG. 11.

The PCE parameter versus rotation angle for the same degrees of nonlinearity is shown as dashed lines in FIG. 15. It can be seen that PCE values obtained for k=0 are significantly higher than those for the other applied nonlinearities. Sharpness of correlation peak increases and/or the output noise floor decreases for lower values of k.

Figure 16:
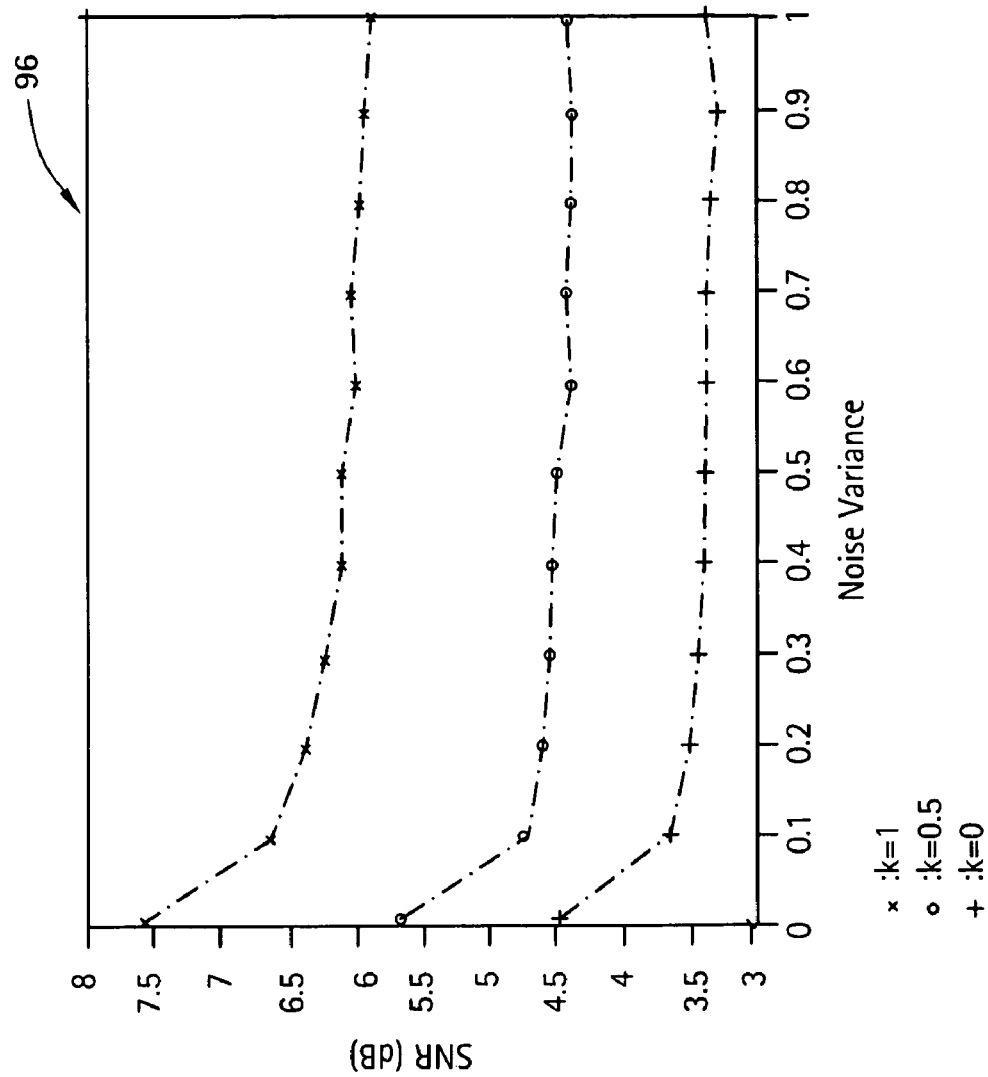
FIG. 16 depicts a plot of signal-to-noise-ratio (SNR) versus noise variance for the rotation invariant ID tag of FIG. 11.

SNR ratio is being used as a metric to evaluate noise robustness of the proposed system. Captured ID tags are corrupted with additive zero mean Gaussian noise. Noise variance ranges from 0 to 1, in steps of 0.1. Statistical values for SNR are obtained after 250 runs. FIG. 16 depicts SNR values versus the rotation angle of the captured ID tag 96. Clearly, linear correlation shows the best robustness against additive Gaussian noise.

If all the results are taken into account as illustrated by FIGS. 15 and 16, it is necessary to achieve a compromise between distortion tolerance, peak sharpness, and noise robustness. Thus, intermediate values of k can produce a trade off between these metrics.

Scale Invariant ID Tag

Figure 17:
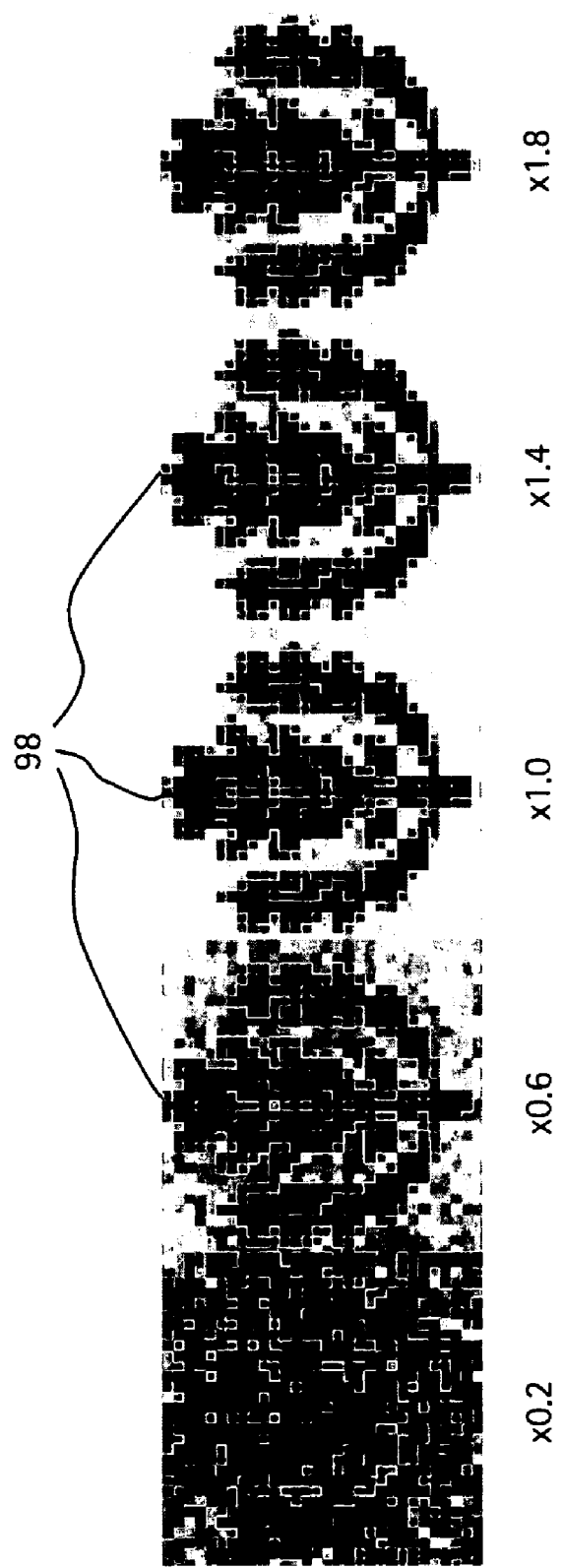
FIG. 17 depicts five decrypted images from the scale invariant ID tag of FIG. 12 captured at various scales.

Invariance to scale variations is tested by using the scale invariant ID tag 86, of an embodiment of the invention, shown in FIG. 12. In this case, using simulations, the scale invariant ID tag 86 has been captured at different distances from the receiver. It is digitally scaled by a factor ranging from 0.2 to 2 in steps of 0.1. Some of the decrypted signatures 98 obtained from this test are shown in FIG. 17. The results correspond to variations of the scale factor in steps of 0.4. Quality of the recovered signature is visually acceptable in all cases. When the scale invariant ID tag 86 is captured from a long distance (that is, small scale factors lower than 0.5 are used), the noise level of the decoded images increases rapidly.

Figure 18:
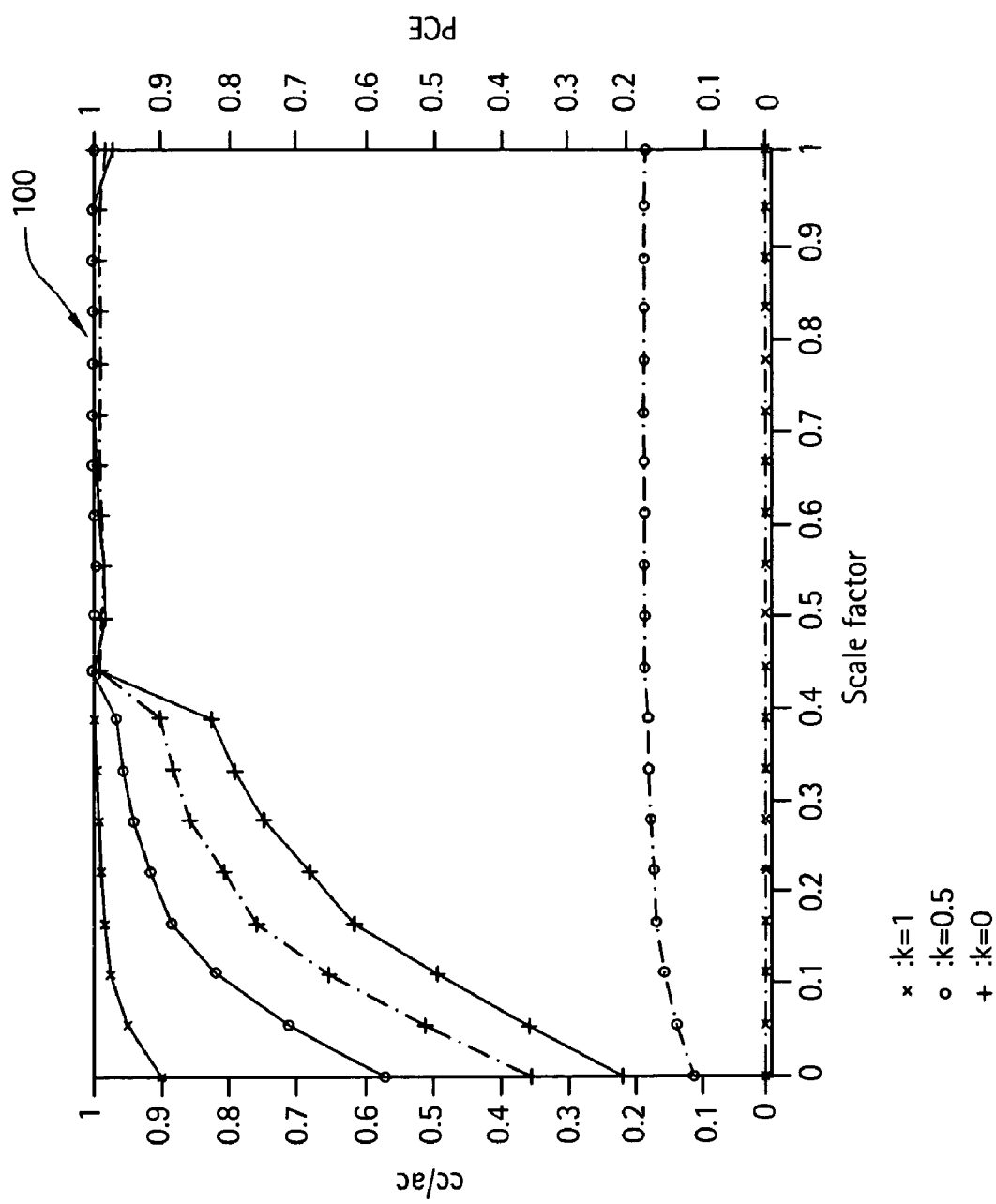
FIG. 18 a plot of discrimination ratio cc/ac and peak-to-correlation energy (PCE) versus scale factor for the scale invariant ID tag of FIG. 12.

Nonlinear correlation of decoded images with the stored reference signature 80 (FIG. 9) is used to evaluate the image quality of the recovered signatures. The graph 100 of FIG. 18 shows the variation of the cc/ac ratio (solid lines) along with the variation of the PCE parameter (dashed lines) versus the scale factor of the scale invariant ID tag 86 for different nonlinearities. Similar to the rotation invariant case, the degree of tolerance of the receiver against scale variations can be adjusted by tuning the parameter k. Value of k=1 corresponds to the most tolerant system, for which the ratio cc/ac remains nearly constant for all the scale factors. It decreases for low scale factors (<0.4). However, it is always kept in values close to unity allowing detection of the signature. On the contrary, for k=0 a highly discriminant processor is obtained and cc/ac values decrease rapidly when the scale invariant ID tag 86 is captured from a large distance (scale factor ≦0.4). Intermediate values for parameter k permits adjusting the system performance.

FIG. 18 also shows the variation of PCE for different scale factors and nonlinearity strengths. High PCE values are obtained for k=0 and they significantly differ from results obtained for the other nonlinearities (k=0.5 and k=1).

Figure 19:
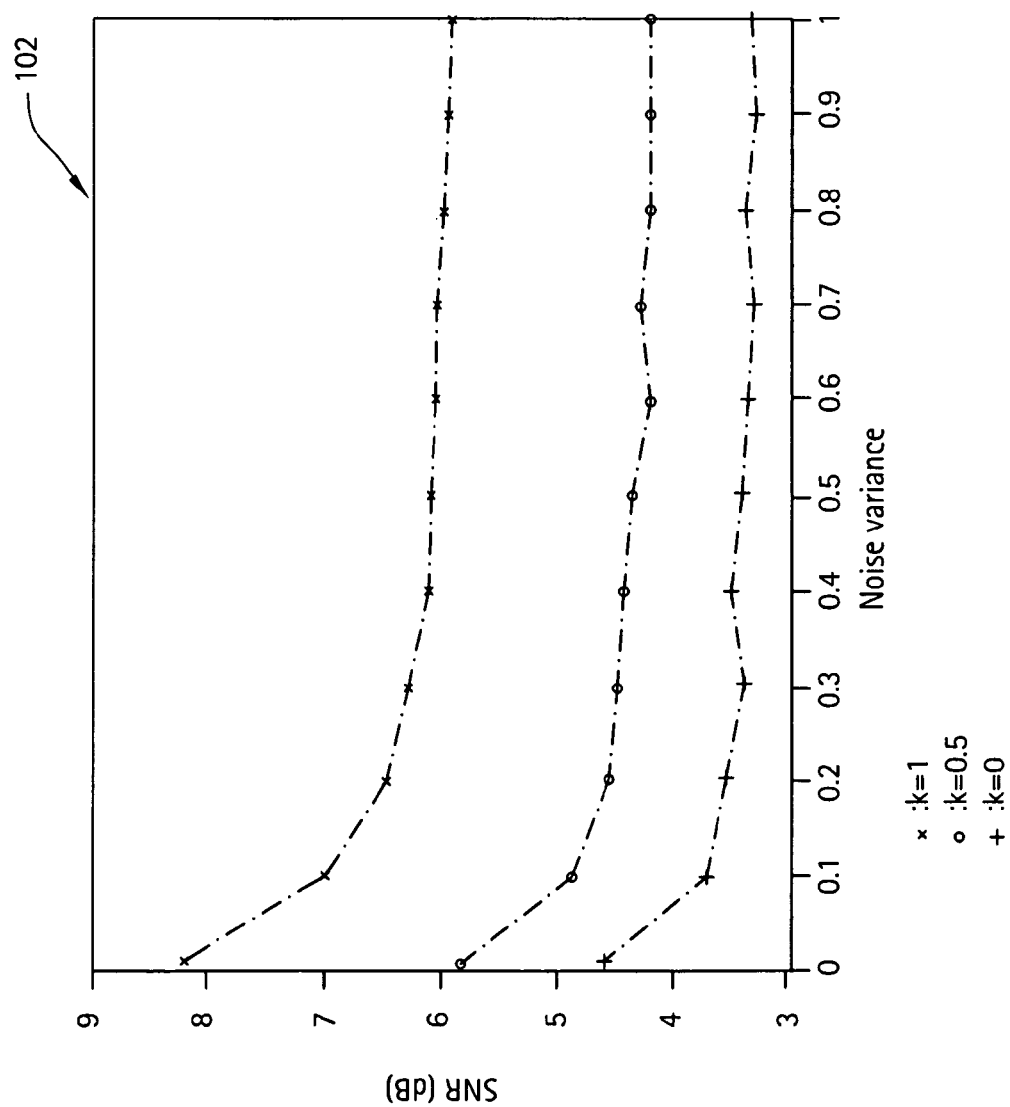
FIG. 19 depicts a plot of Signal-to-noise-ratio (SNR) versus noise variance for the scale invariant ID tag of FIG. 12.

SNR versus noise variance 102 is depicted in FIG. 19. As expected, the best results of this metric are obtained for the linear case (k=1).

From the analysis carried out and presented in FIGS. 18 and 19, an intermediate value of k (such as k=0.5) seems to be a good compromise to achieve a reasonable performance of the processor.

Rotation and Scale Invariant ID Tag

Figure 20:
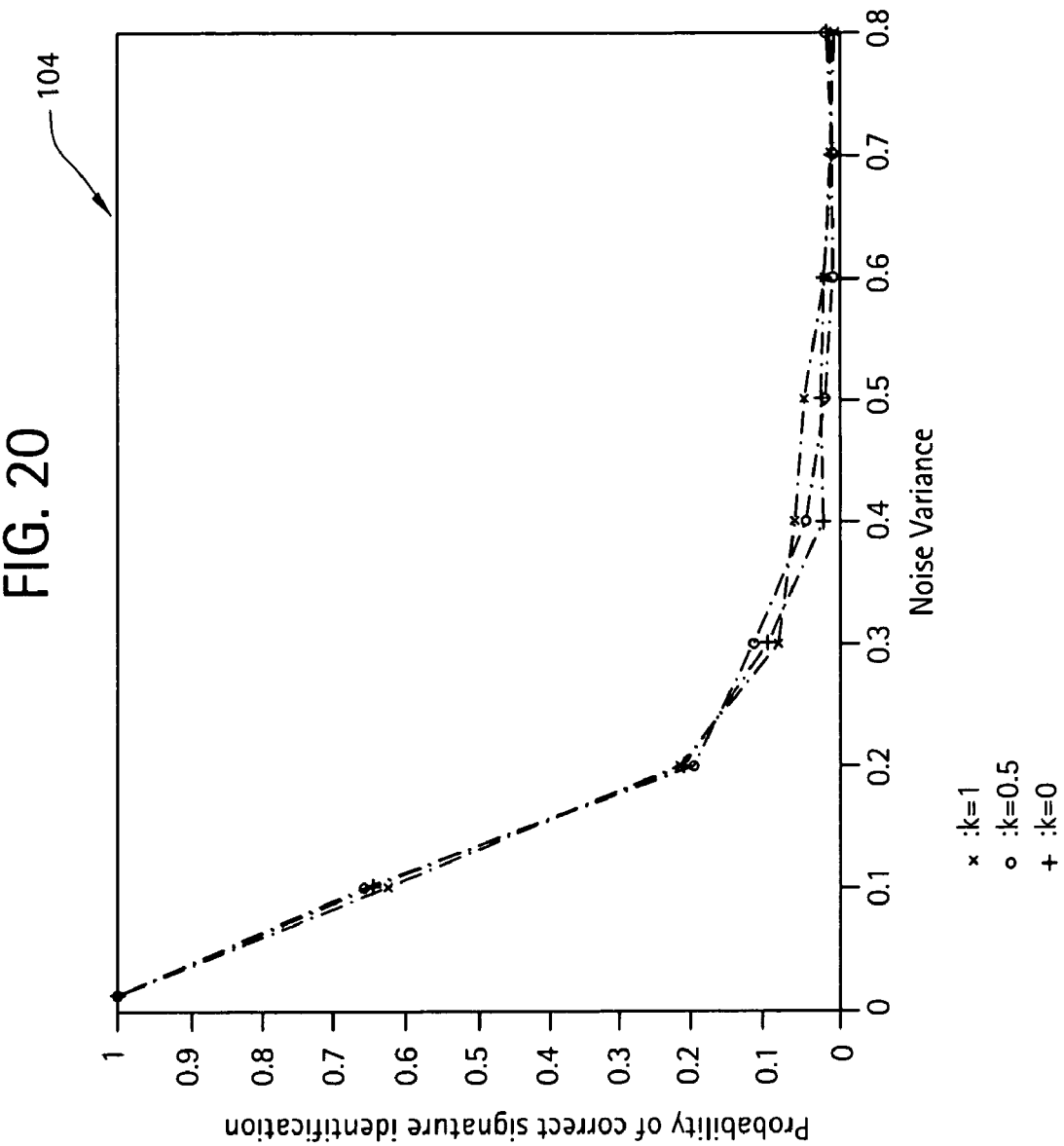
FIG. 20 depicts a plot of probability of correct signature versus noise variance for images captured of the rotation and scale invariant ID tag of FIG. 13 rotated at 40 degrees.

An integrated rotation and scale invariant ID tag (FIG. 13), in accordance with an embodiment of the invention, is used in experiments for identification purposes. Similar to the preceding sections on Rotation Invariant ID Tags and Scale Invariant ID Tags, numerical experiments were carried out to evaluate the ID tag tolerance to scale variations and in-plane rotations, separately. The main difference in comparison to the procedure followed in the previous subsections is that for the integrated rotation and scale invariant ID tag, it is necessary to detect the border between the two distinct regions of the tag. A gradient operation is carried out to this end. Results obtained for the integrated rotation and scale invariant ID tag 90, are very close to those previously provided for the rotation invariant ID tag 84, and for the scale invariant ID tag 86 (FIGS. 14-19). However, the gradient operation carried out to determine the border between the rotation invariant region and the scale invariant region, is very sensitive to additive noise. SNR results are low and the verification system is not able to recover the encoded signature from the rotation and scale invariant ID tag 90, when additive noise with a variance larger than 0.2 is present. FIG. 20 shows the probability of correct signature identification 104, when the captured rotation and scale invariant ID tag 90 is rotated 40° and is distorted by additive noise with different variance levels. Probability of correct detection decreases rapidly when noise variance is increased because the border between the rotation invariant area and the scale invariant area is not properly detected by using the gradient operation. Thus, the recovered phase code from the ID tag is degraded. For large noise, decryption and as a result verification by correlation is not achieved properly. Therefore, the results for different k values coincide because correlation is carried out between the reference signal and an incorrect decrypted signature, which is an image containing only noise distribution. Thus, the procedure for correct border detection should be improved to increase the probability of correct signature identification. Clearly, a simple gradient operation is not sufficient in the case of noisy tags. There are a number of techniques that can be utilized to detect the edge between two different signals in a noisy environment. For low levels of noise, both linear and non-linear filters will do very well in terms of detection and discrimination. When the rotation invariant ID tag 84 (FIG. 11) is used, the results are much better in terms of the identification of the signature.

Figure 21:
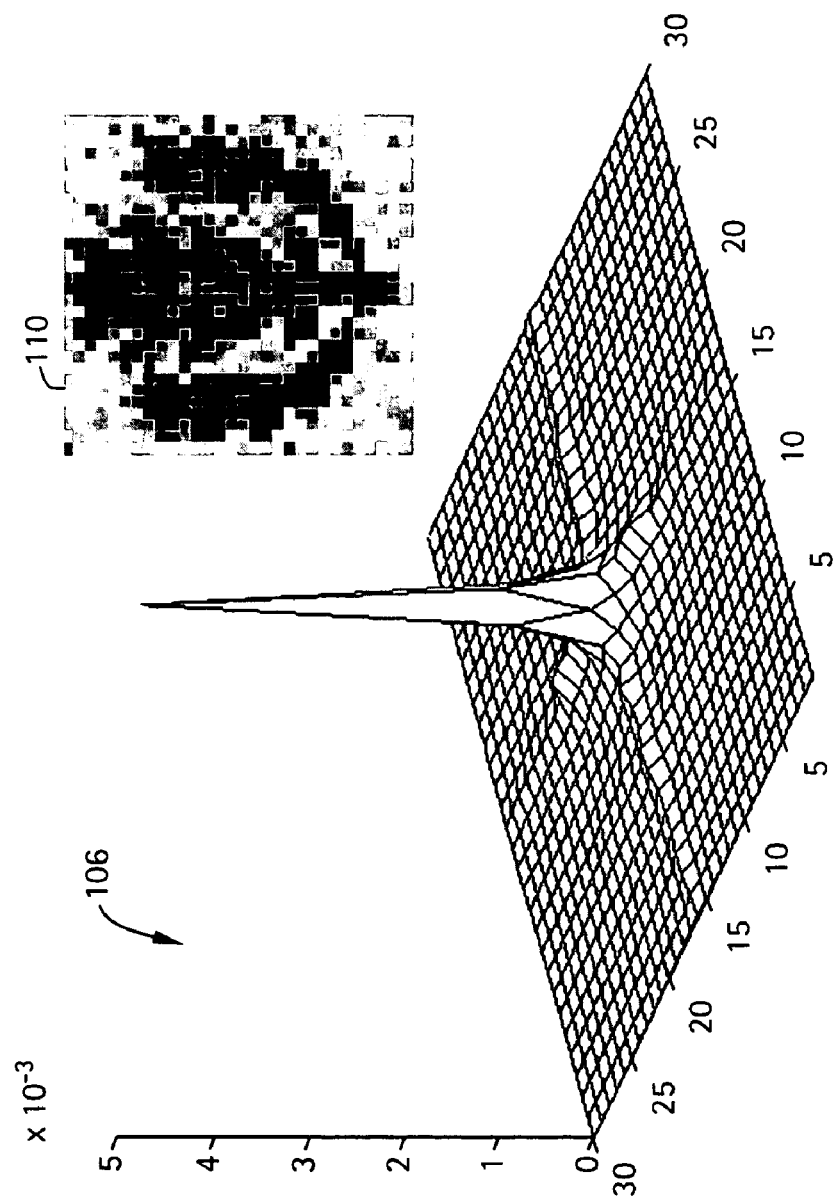
FIG. 21 depicts a decoded signature and correlation outputs for the rotation and scale-invariant ID tag shown in FIG. 13 for a scale factor of ×0.9, rotation angle of 10 degrees, and a noise variance of 0.10.
Figure 22:
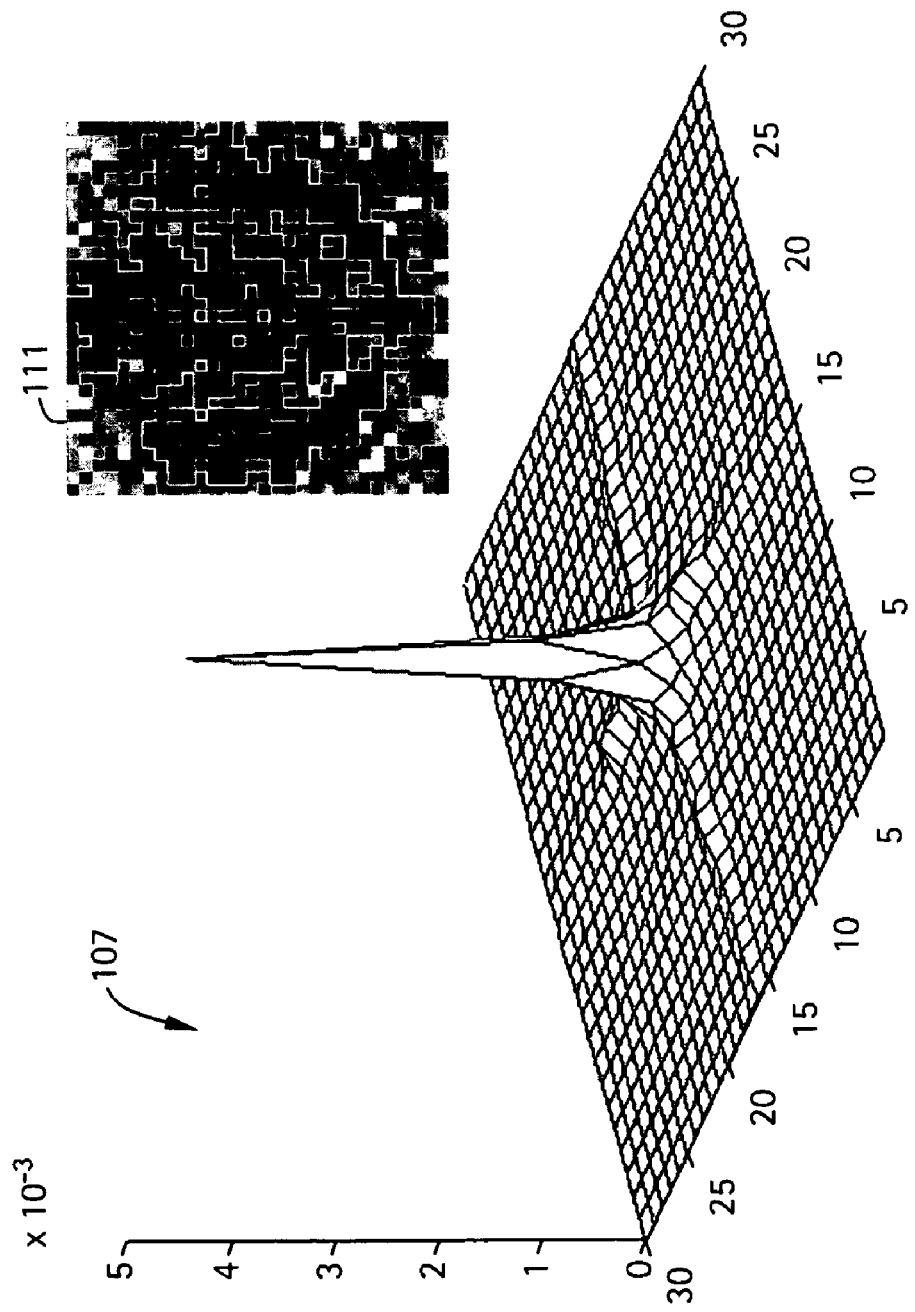
FIG. 22 depicts a decoded signature and correlation outputs for the rotation and scale invariant ID tag shown in FIG. 13 for a scale factor of ×0.8, rotation angle of 40 degrees, and a noise variance of 0.10.
Figure 23:
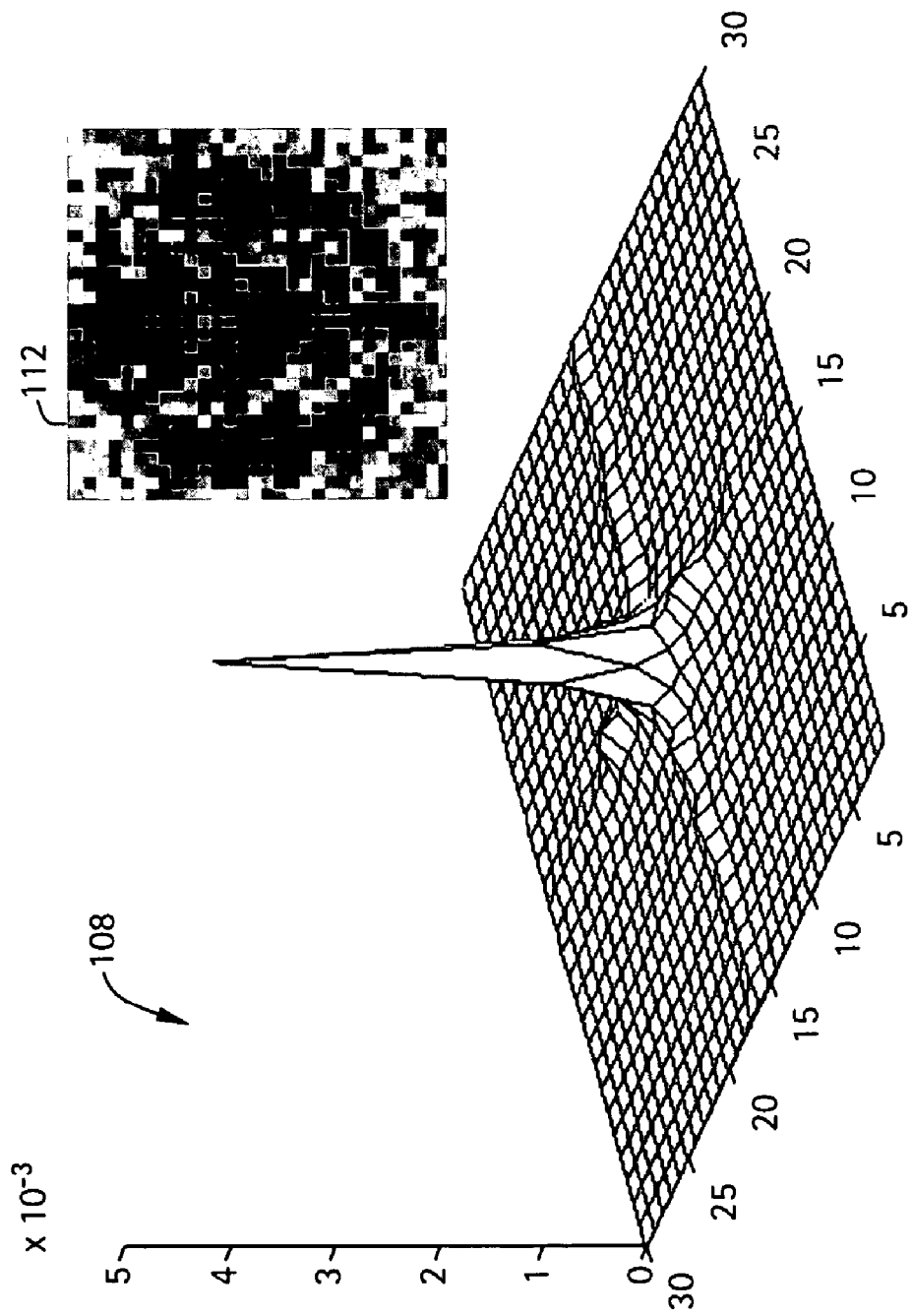
FIG. 23 depicts a decoded signature and correlation outputs for the rotation and scale invariant ID tag shown in FIG. 13 for a scale factor of ×0.7, and rotation angle of 10 degrees.

Finally, an identification system, in accordance with an embodiment of the invention, is tested against rotation and scale distortion appearing simultaneously in the captured ID tag. FIGS. 21-23 display the output planes 106, 107, 108 of the recognition system along with the decoded signatures 110, 111, 112 obtained for different rotations and scales of the ID tags. The output plane 106 and decoded signature 110 of FIG. 21 corresponds to a rotation and scale invariant ID tag distorted by a scale factor of 0.9 and rotated 10 degrees. A zero mean Gaussian noise with 0.1 variance has been added to the captured ID tag. A value of k=0.5 is used for correlation and a narrow and high correlation peak allows detection and verification of the signature. The output plane 107 and decoded signature 111 of FIG. 22 corresponds to an ID tag distorted by a scale factor of 0.8 and rotated by 40 degrees with zero mean additive noise with variance 0.1. Identification is also achieved as shown in this figure when k=0.5. The output plane 108 and decoded signature 112 of FIG. 23 corresponds to an ID tag modified by a scale factor of 0.7 and rotated by 80 degrees. No noise is added in this example. The signature has been correctly decoded and identified by using k=0.5 for correlation.

Figure 24:
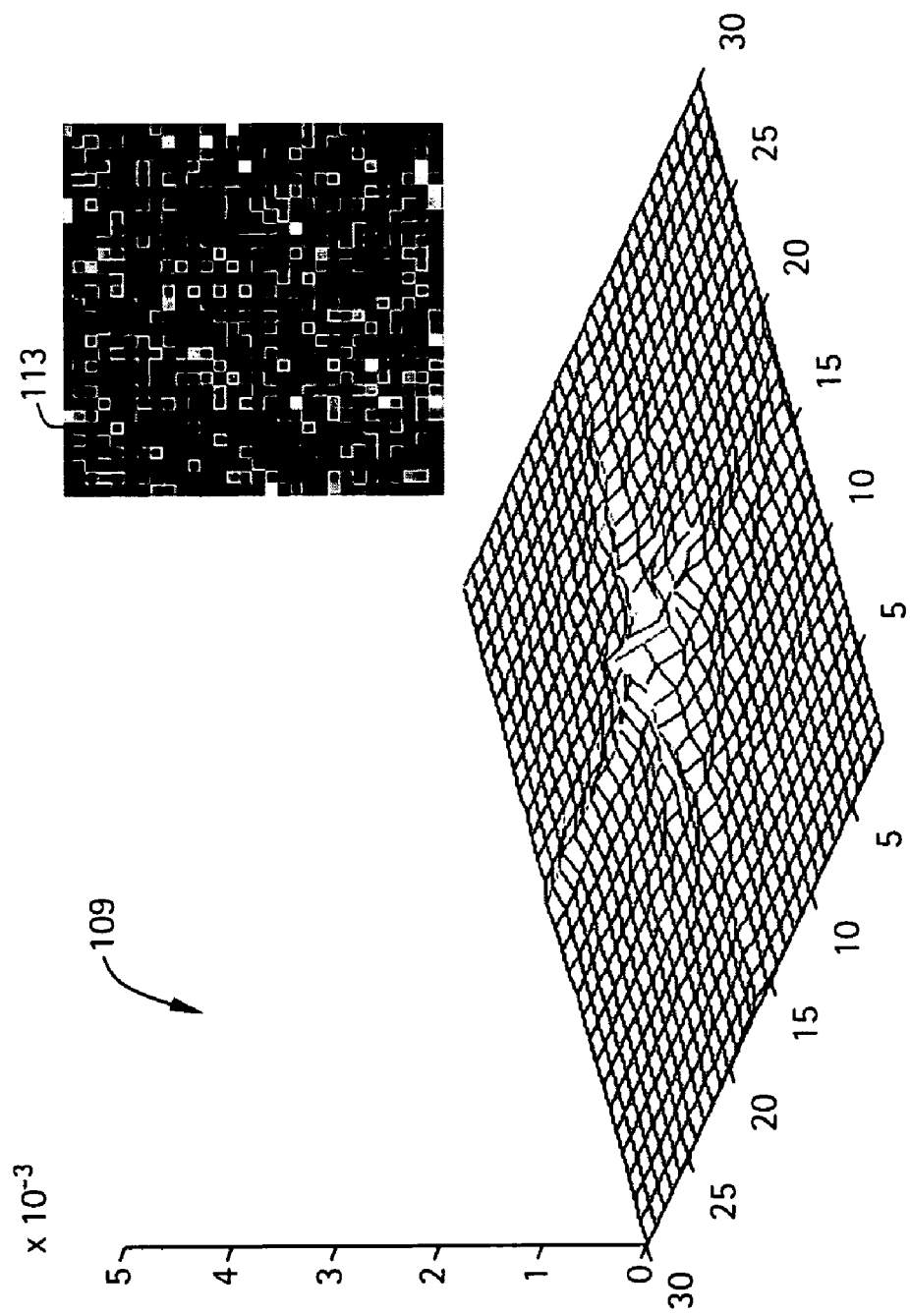
FIG. 24 depicts a decoded signature and correlation outputs for the rotation and scale invariant ID tag shown in FIG. 13 for a scale factor of ×0.8, and rotation angle of 40 degrees using a false phase key when the decoded image is compared with the stored reference image of FIG. 1.

To demonstrate the robustness of the ID tags for verification and identification, the decrypted information was recovered from a rotated (40 degrees) and scaled (0.8 scale factor) ID tag. However, the recovered encoded information was decrypted by using a false phase key. The result is a noisy image where no signature can be recognized as is shown by the output plane 109 and decoded signature 113 of FIG. 24.

Figure 25:
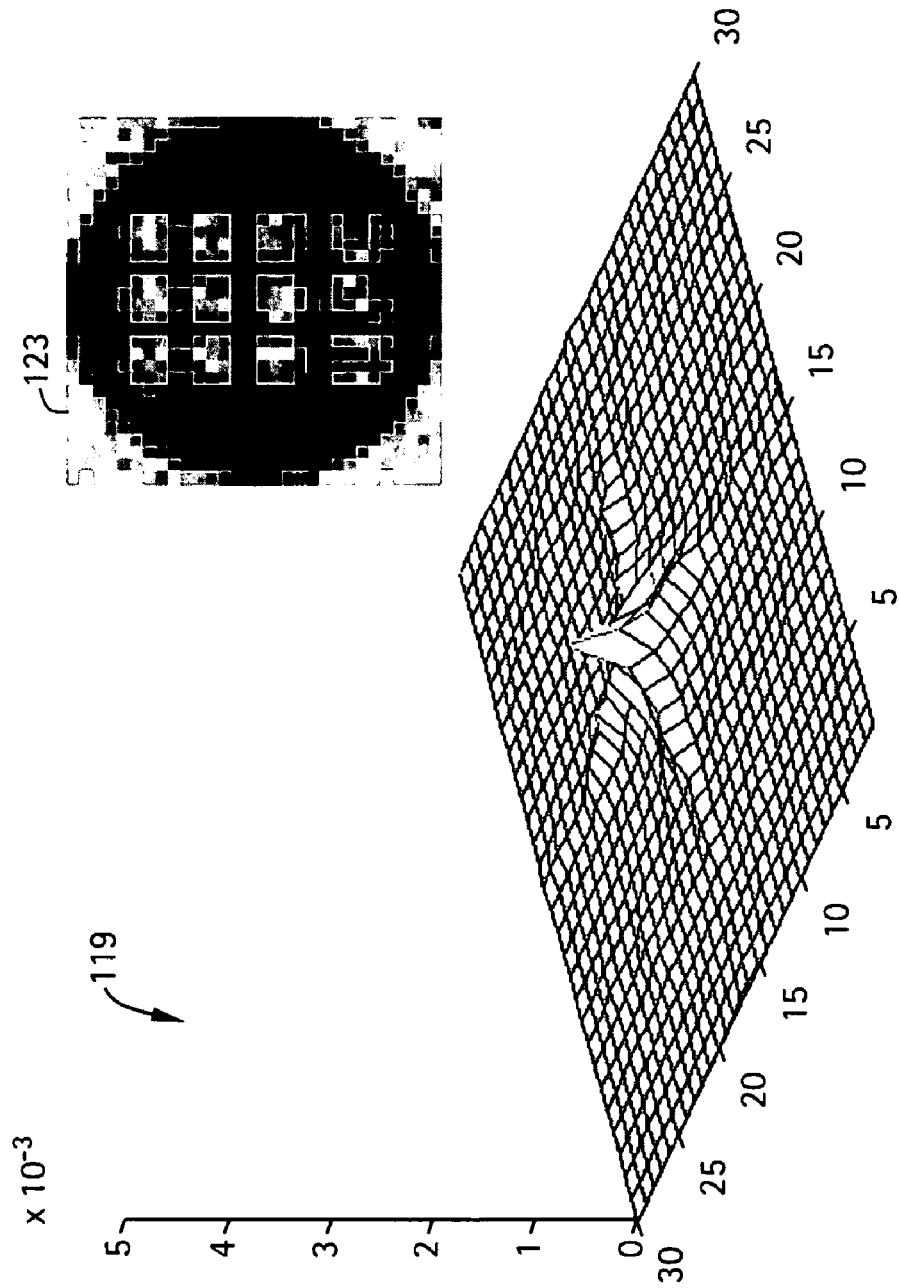
FIG. 25 depicts a decoded signature and correlation outputs for a rotation and scale invariant ID tag of an alternate original image with the correct phase key for a scale factor of ×0.8, and rotation angle of 40 degrees when the decoded image is compared with the stored reference image of FIG. 11.

It is also important to demonstrate that a different signature, even if it is correctly decrypted with the appropriated phase key, will not be recognized as the reference image. FIG. 25 presents a decoded signature 123 corresponding to a different logo, and the corresponding correlation output plane 119 with a low peak. Thus, the decoded signature 123 is discriminated from the authentic signature 80, of FIG. 9, used in the previous experiments.

Discussion Of Results

An embodiment of a method to obtain a rotation invariant, a scale invariant, and both a rotation and scale invariant optical ID tag has been presented. The ID tags can be used for real-time remote identification and authentication of vehicles and objects, which have diverse applications in transportation and homeland security. The ID tags consist of a phase code containing double phase encrypted information to increase security. The encrypted signature is encoded in the ID tag to provide the desired distortion invariance by multiplexing and using different topologies to encode the information.

The designed ID tags can be placed on a vehicle, and are captured by a receiver, which will decode and verify the object. Signature may be a characteristic image that allows identification of the vehicle. Decryption and verification processes can be performed using PCs to assure real-time identification and authentication of vehicles.

Results, presented herein, demonstrate that embodiments of the proposed system is able to recover a given signature even if the ID tag is rotated, scaled, or both rotated and scaled simultaneously. The method used in an exemplary embodiment for encrypting the signature has been shown to be effective against using an unauthorized key for the decryption technique. Also, the receiver is able to discriminate between a given signature used as a reference image and a different image by using correlation. Noise robustness of an embodiment in the proposed system is analyzed by measuring the SNR metric. The rotation and scale invariant ID tag presents the worst results in terms of noise robustness. This is due to the fact that it is necessary to detect the border between the rotation invariant information and the scale invariant information written into the ID tag. A gradient operation is used to achieve this detection, which is sensitive to the presence of additive noise. Other edge detection techniques may improve the results. Other distortion-tolerant techniques may be studied. However, embodiments disclosed herein may have an advantage of simplicity.

An embodiment of the disclosed method relates to securely storing data on a data storage device and retrieving data from said data storage device, the method comprising: creating an image matrix of a data image, encrypting the image matrix to create a white noise encrypted matrix, mapping the white noise matrix to a one-dimensional array, encoding the array onto said data storage device, capturing the array from said data storage device, decoding the array into the white noise matrix, and decrypting the white noise matrix into the image matrix.

An embodiment of the disclosed device relates to a data storage device for automatic identification, comprising an optical identification tag with data encoded thereon, wherein the encoded data is encrypted and encoded in a vector notation onto the optical identification tag.

One of ordinary skill in the art can appreciate that a computer or other client or server device can be deployed as part of a computer network, or in a distributed computing environment. In this regard, the methods and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein are operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus described above and/or claimed herein. Further, any storage techniques used in connection with the methods and apparatus described above and/or claimed herein may invariably be a combination of hardware and software.

The operations and methods described herein may be capable of or configured to be or otherwise adapted to be performed in or by the disclosed or described structures.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom. Furthermore, it should be emphasized that a variety of computer platforms, including handheld device operating systems and other application specific operating systems are contemplated, especially given the number of wireless networked devices in use.

While the description above refers to particular embodiments, it will be understood that many modifications may be made without departing from the spirit thereof. The accompanying claims are intended to cover such modifications as would fall within the true scope and spirit of the present invention.

What is claimed is:

1. A rotation invariant data storage device, comprising:
a data storage device with an optically sensible image;
encoded data stored within the sensible image; and
a plurality of radial vectors to store the encoded data, wherein the encoded data comprises an image that has been encrypted to a two-dimensional (2-D) white noise matrix and converted to a one-dimensional (1-D) array comprising a plurality of pixels;
wherein the plurality of radial vectors are provided adjacent to each other so as to form a plurality of concentric circles or arcs of circles and the plurality of radial vectors are configured such that the plurality of pixels can be read in a radial direction.

2. The rotation invariant data storage device of claim 1, wherein:
each radial vector includes a full copy of the data stored.

3. The rotation invariant data storage device of claim 1, wherein:
the plurality of radial vectors are encoded with a continuous function.

4. The rotation invariant data storage device of claim 1, wherein:
the plurality of radial vectors are encoded with a discrete matrices.

5. The rotation invariant data storage device of claim 1, wherein:
the encryption to a 2-D matrix includes a double random phase encryption.

6. The rotation invariant data storage device of claim 5, wherein:
the double phase encryption has been performed optically.

7. The rotation invariant data storage device of claim 5, wherein:
the double phase encryption has been performed electronically.

8. The rotation invariant data storage device of claim 5, wherein:
the double phase encryption has been performed with a key.

9. The rotation invariant data storage device of claim 1, wherein the plurality of radial vectors are provided in a first set at a first radial distance and in a second set at a second radial distance concentric with the first set.

10. The rotation invariant data storage device of claim 1, wherein the plurality of radial vectors are provided adjacent to each other so as to form a plurality of concentric half-circles.

11. A rotation invariant and scale invariant data storage identification (ID) tag, comprising:
a tag with an optically sensible image;
encoded data stored within the sensible image;
a plurality of radial vectors stores the encoded data, wherein the encoded data comprises an image that has been encrypted to a two-dimensional (2-D) white noise matrix and converted to a one-dimensional (1-D) array comprising a plurality of pixels; and
a plurality of sectors of a circular arc store the encoded data, wherein the encoded data comprises an image that has been encrypted to a two-dimensional (2-D) white noise matrix and converted to a one-dimensional (1-D) array, and the plurality of sectors are positioned within a first fraction of a circle and the plurality of radial vectors are positioned within a second fraction of the circle not containing the plurality of sectors;
wherein the plurality of radial vectors are provided adjacent to each other so as to form a plurality of concentric circles or arcs of circles and the plurality of radial vectors are configured such that the plurality of pixels can be read in a radial direction.

12. The rotation invariant and scale invariant data storage tag of claim 11, wherein:
the plurality of sectors in the fraction of a circle containing the plurality of sectors are positioned within concentric circular arcs.

13. The rotation invariant and scale invariant data storage tag of claim 11, wherein:
the encryption to the 2-D matrix includes a double random phase encryption.

14. The rotation invariant and scale invariant data storage tag of claim 13, wherein:
the phase encryption has been performed optically.

15. The rotation invariant and scale invariant data storage tag of claim 13, wherein:
the phase encryption has been performed electronically.

16. The rotation invariant and scale invariant data storage tag of claim 13, wherein:
the phase encryption has been performed with a key.

17. A method of encoding a data storage device, the method comprising:
encrypting an image into a two-dimensional (2-D) white noise matrix;
encoding the 2-D matrix to a one-dimensional (1-D) array;
encoding the data storage device with the 1-D array into a plurality of radial vectors comprising a plurality of pixels;
arranging the plurality of radial vectors adjacent to each other so as to form a plurality of concentric circles or arcs of circles, whereby the plurality of radial vectors are configured such that the plurality of pixels can be read in a radial direction.

18. The method of encoding the data storage device of claim 17, further comprising:
encoding the data storage device with the 1-D array into a plurality of radial vectors with a continuous function.

19. The method of encoding the data storage device of claim 17, further comprising:
encoding the data storage device with the 1-D array into a plurality of radial vectors as discrete matrices.

20. The method of encoding the data storage device of claim 17, further comprising:
encrypting the image with double random phase encryption.

21. The method of encoding the data storage device of claim 20, further comprising:
optically encrypting the image with double random phase encryption.

22. The method of encoding the data storage device of claim 20, further comprising:
electronically encrypting the image with double random phase encryption.

23. The method of encoding the data storage device of claim 20, further comprising:
encrypting the image with double random phase encryption with a key.

24. A method of decoding an image captured from a data storage device, the method comprising:
reading out a radial vector comprising a plurality of pixels in a radial direction of the image;
decoding the radial vector of the captured image into a one-dimensional (1-D) array;
decoding the 1-D array into a two-dimensional (2-D) white noise matrix; and
decrypting the 2-D matrix with a double random phase decryption and a phase key into an image.

25. The method of claim 24, further comprising:
averaging multiple radial vectors of the image; and
decoding the averaged radial vector to attain the 1-D array.

26. A method of decoding and authenticating an image captured from a data storage device, the method comprising:
reading out a radial vector comprising a plurality of pixels in a radial direction of the image;
decoding the radial vector of the captured image into a one-dimensional (1-D) array;
decoding the 1-D array into a two-dimensional (2-D) white noise matrix;
decrypting the 2-D matrix with a double random phase decryption and a phase key into a decrypted image; and
comparing the decrypted image to a stored reference image to authenticate the data storage device.

27. A method of decoding and authenticating an image captured from a data storage device, the method comprising:
decoding adjacent sectors of the captured image into a one-dimensional (1-D) array;
decoding the 1-D array into a two-dimensional (2-D) white noise matrix;
decrypting the 2-D matrix with a double random phase decryption and a phase key into a decrypted image;
comparing the decrypted image to a stored reference image to authenticate the data storage device;
reading out a radial vector comprising a plurality of pixels in a radial direction of the image;
decoding the radial vector of the captured image into a second one-dimensional (1-D) array;
decoding the second 1-D array into a second two-dimensional (2-D) white noise matrix;
decrypting the second 2-D matrix with a double random phase decryption and a phase key into a second decrypted image; and
comparing the second decrypted image to the stored reference image to authenticate the data storage device.

28. A computer program product for encoding data to an optical data storage device in a computer environment, the computer program product comprising a non-transitory storage medium readable by a processing circuit and storing instructions for execution by the processing circuit for facilitating a method comprising:
receiving an image to be encoded;
encrypting the image into a two-dimensional (2-D) white noise matrix;
encoding the 2-D matrix to a one-dimensional (1-D) array; and
encoding the data storage device with the 1-D array onto an optical data storage device;
wherein the optical data storage device comprises:
a plurality of radial vectors each storing encoded data, wherein the encoded data comprises the 1-D array comprising a plurality of pixels;
wherein the plurality of radial vectors are provided adjacent to each other so as to form a plurality of concentric circles or arcs of circles and the plurality of radial vectors are configured such that the plurality of pixels can be read in a radial direction.

29. A computer program product for decoding data captured from an optical data storage device in a computer environment, the computer program product comprising a non-transitory storage medium readable by a processing circuit and storing instructions for execution by the processing circuit for facilitating a method comprising:
receiving encoded data from a captured image of an optical data storage device;
decoding the encoded data into a one-dimensional (1-D) array;
decoding the 1-D array into a two-dimensional (2-D) white noise matrix; and
decrypting the 2-D matrix with a double random phase decryption and a phase key into an image;
wherein the optical data storage device comprises:
a plurality of radial vectors each storing encoded data, wherein the encoded data comprises the 1-D array comprising a plurality of pixels;
wherein the plurality of radial vectors are provided adjacent to each other so as to form a plurality of concentric circles or arcs of circles and the plurality of radial vectors are configured such that the plurality of pixels can be read in a radial direction.

30. The method of claim 29, further comprising:
comparing the decrypted image to a stored reference image to authenticate the data storage device.

31. A distortion invariant data storage device, comprising:
an optically sensible and distortion invariant image; and
encrypted data encoded within the image;
wherein the optically sensible and distortion invariant image comprises:
a plurality of radial vectors comprising a plurality of pixels, each of the plurality of radial vectors storing the encrypted data;
wherein the plurality of radial vectors are provided adjacent to each other so as to form a plurality of concentric circles or arcs of circles and the plurality of radial vectors are configured such that the plurality of pixels be read in a radial direction.

32. A method of encoding a data storage device, the method comprising
encrypting a reference image into a two-dimensional (2-D) white noise matrix;
encoding the 2-D matrix to a one-dimensional (1-D) array;
encoding the 1-D array into a distortion invariant image; and
applying the distortion invariant image to the data storage device;
wherein the distortion invariant image comprises:
a plurality of radial vectors comprising a plurality of pixels, each of the plurality of radial vectors storing the encrypted data;
wherein the plurality of radial vectors are provided adjacent to each other so as to form a plurality of concentric circles or arcs of circles and the plurality of radial vectors are configured such that the plurality of pixels can be read in a radial direction.

33. A method of decoding an image captured from a data storage device, the method comprising:
decoding a distortion invariant image into a one-dimensional (1-D) array;
decoding the 1-D array into a two dimensional (2-D) white noise matrix; and
decrypting the 2-D matrix into an image;

wherein the distortion invariant image comprises:
a plurality of radial vectors comprising a plurality of pixels, each of the plurality of radial vectors storing encrypted data;
wherein the plurality of radial vectors are provided adjacent to each other so as to form a plurality of concentric circles or arcs of circles and the plurality of radial vectors are configured to be read in a radial direction.

34. The method of decoding an image of claim 33, the method further comprising:
comparing the decrypted image to a stored reference image to authenticate the data storage device.

* * * * *

UNITED STATES PATENT AND TRADEMARK OFFICE
CERTIFICATE OF CORRECTION

PATENT NO.         : 8,155,312 B2
APPLICATION NO.    : 11/531851
DATED              : April 10, 2012
INVENTOR(S)        : Javidi et al.

It is certified that error appears in the above-identified patent and that said Letters Patent is hereby corrected as shown below:

On Page 2, in Item (56), under "OTHER PUBLICATIONS", in Column 1, Line 9, delete "Multricriteria" and insert -- Multicriteria --, therefor.

On Page 2, in Item (56), under "OTHER PUBLICATIONS", in Column 1, Line 18, delete "(pp. 157-163." and insert -- (pp. 157-163). --, therefor.

On Page 2, in Item (56), under "OTHER PUBLICATIONS", in Column 1, Line 19, delete "IIntroduction" and insert -- Introduction --, therefor.

In the Specifications:

In Column 2, Line 26, delete "image. 1" and insert -- image. --, therefor.

In Column 3, Line 53, delete "scale-invariant" and insert -- scale invariant --, therefor.

In Column 3, Line 67, delete "FIG. 1;" and insert -- FIG. 11; --, therefor.

In Column 4, Line 61, delete "Encyption" and insert -- Encryption --, therefor.

In Column 8, Line 9, in Equation (7), delete "$\leq 0$" and insert -- $\leq 0.$ --, therefor.

In Column 9, Line 24, delete "Experiential" and insert -- Experimental --, therefor.

In Column 11, Line 34, delete "because-the" and insert -- because the --, therefor.

In the Claims:

In Column 15, Line 61, in Claim 11, delete "stores" and insert -- to store --, therefor.

Signed and Sealed this
Twenty-fifth Day of September, 2012

David J. Kappos
*Director of the United States Patent and Trademark Office*

CERTIFICATE OF CORRECTION (continued)
U.S. Pat. No. 8,155,312 B2

In Column 15, Line 66, in Claim 11, delete "arc" and insert -- arc to --, therefor.

In Column 18, Line 44, in Claim 32, delete "comprising" and insert -- comprising: --, therefor.